US012287301B2

(12) United States Patent
Kikuchi et al.

(10) Patent No.: US 12,287,301 B2
(45) Date of Patent: Apr. 29, 2025

(54) CORRECTION AMOUNT SPECIFYING APPARATUS, METHOD, PROGRAM, AND JIG

(71) Applicant: Rigaku Corporation, Tokyo (JP)

(72) Inventors: Takuya Kikuchi, Tokyo (JP); Tetsuya Ozawa, Tokyo (JP); Ryuji Matsuo, Tokyo (JP)

(73) Assignee: RIGAKU CORPORATION, Tokyo (JP)

( * ) Notice: Subject to any disclaimer, the term of this patent is extended or adjusted under 35 U.S.C. 154(b) by 253 days.

(21) Appl. No.: 17/988,867

(22) Filed: Nov. 17, 2022

(65) Prior Publication Data

US 2023/0152248 A1 May 18, 2023

(30) Foreign Application Priority Data

Nov. 18, 2021 (JP) ................. 2021-188118

(51) Int. Cl.
*G01N 23/207* (2018.01)
*G01N 23/20016* (2018.01)

(52) U.S. Cl.
CPC ..... *G01N 23/207* (2013.01); *G01N 23/20016* (2013.01); *G01N 2223/056* (2013.01); *G01N 2223/1003* (2013.01); *G01N 2223/1016* (2013.01); *G01N 2223/3035* (2013.01); *G01N 2223/3037* (2013.01); *G01N 2223/304* (2013.01); *G01N 2223/32* (2013.01)

(58) Field of Classification Search
None
See application file for complete search history.

(56) References Cited

U.S. PATENT DOCUMENTS

| 2,709,752 | A | * | 5/1955 | Hamacher | ........ | G01N 23/20008 |
| | | | | | | 33/645 |
| 3,428,802 | A | * | 2/1969 | Shah | ............ | G01N 23/207 |
| | | | | | | 378/71 |
| 4,961,210 | A | * | 10/1990 | Fatemi | ............ | G01N 23/207 |
| | | | | | | 378/77 |

(Continued)

FOREIGN PATENT DOCUMENTS

| GB | 777275 A | * | 6/1957 |
| JP | H03183938 A | * | 8/1991 |

(Continued)

OTHER PUBLICATIONS

Machine translation of JP H7-260598 A, cited in the IDS filed Nov. 17, 2022 (Year: 1995).*

*Primary Examiner* — Thomas R Artman
(74) *Attorney, Agent, or Firm* — XSENSUS LLP

(57) ABSTRACT

A correction amount specifying apparatus comprises circuitry for storing diffraction data including a combination of the diffraction angle of the irradiation X-rays with respect to the sample rotation angle and the sample surface height, the diffraction data being acquired by irradiating X-rays to a standard sample that is an aggregate of isotropic and stress free crystal particles, determining a first correspondence relationship based on the diffraction data, and specifying a correction amount of the sample surface height with respect to a desired sample rotation angle and a desired diffraction angle based on the first correspondence relationship.

12 Claims, 26 Drawing Sheets

(56) References Cited

U.S. PATENT DOCUMENTS

| | | | | |
|---|---|---|---|---|
| 5,359,640 | A * | 10/1994 | Fink | G01N 23/207 |
| | | | | 378/81 |
| 5,475,728 | A * | 12/1995 | Smith | G01N 23/20 |
| | | | | 378/81 |
| 6,831,962 | B2 * | 12/2004 | Lentfer | G01N 23/20016 |
| | | | | 378/81 |
| 7,711,088 | B2 * | 5/2010 | Gibson | G01N 23/207 |
| | | | | 378/74 |
| 10,416,102 | B2 * | 9/2019 | He | G01N 23/2055 |
| 2003/0068010 | A1 * | 4/2003 | Lentfer | G01N 23/20016 |
| | | | | 378/81 |
| 2005/0018809 | A1 * | 1/2005 | Gibson | G01N 23/207 |
| | | | | 378/71 |
| 2018/0372658 | A1 * | 12/2018 | He | G01N 23/2055 |
| 2023/0152248 | A1 * | 5/2023 | Kikuchi | G01N 23/207 |
| | | | | 378/81 |

FOREIGN PATENT DOCUMENTS

| | | | |
|---|---|---|---|
| JP | H03269351 A | | 11/1991 |
| JP | H05126767 A | * | 5/1993 |
| JP | H05288616 A | | 11/1993 |
| JP | H07260598 A | | 10/1995 |
| JP | H0894549 A | | 4/1996 |

* cited by examiner

CORRECTION AMOUNT SPECIFYING APPARATUS, METHOD, PROGRAM, AND JIG

CROSS-REFERENCE TO RELATED APPLICATIONS

This application is based upon and claims the benefit of priority from Japanese Patent Application No. 2021-188118, filed Nov. 18, 2021, the entire contents of which are incorporated herein by reference.

BACKGROUND

Field

The present disclosure relates to a correction amount specifying apparatus, a method, a program, and a jig for correcting a beam irradiation position.

Description of the Related Art

Components of electronic devices such as televisions, personal computers, or mobile phones are downsized year by year. Along with this, the micro area is often analyzed in evaluating the function and performance of those electronic devices. In addition, components of transportation machines such as automobiles tend to be downsized in order to reduce $CO_2$ and improve fuel efficiency, and micro areas are often analyzed.

X-rays are commonly used in these analyses. In order for an apparatus to analyze a micro area to irradiate an X-ray beam at a certain point, high crossing accuracy of each axis is required. Thus, such apparatuses often adopt a vertical goniometer with a relatively heavy x-ray source fixed thereto.

However, in this case, it is necessary to install the sample on the goniometer in an orientation inclined by 90° from the direction of gravity. There is a disadvantage in that the sample must be firmly installed on the stage, and heavy objects cannot be measured. On the other hand, in recent X-ray diffraction apparatuses, a horizontal goniometer which installs a sample in the stage horizontal with the floor is becoming the mainstream. Such a mechanism does not require complicated fixation and is relatively easy to measure even in heavy objects. In addition, while the sample installation is simplified, the crossing accuracy for analyzing the micro area is lowered.

The irradiation position of the X-ray beam is harder to be shifted in the horizontal goniometer. However, even if either goniometer is adopted, angular deviation or positional deviation occurs due to the deflection caused by the self-weight of the shaft that occurs when the angle of the shaft is changed or the machining error of the machine. Then, the measurement position of the sample or the irradiation position of the X-ray beam from the position of the mechanical rotation axis deviates. Therefore, in qualitative, quantitative, stress, or pole measurement in a micro area, diffracted X-rays from a region other than the region to be measured are detected, and unnecessary information is included in the analysis data. Further, the deviation of the position of the X-ray beam or the measurement position of the sample affects the diffraction angle, and the measurement accuracy is lowered.

On the other hand, a technique for aligning a micro area on a sample with a rotation axis is known (Patent Documents 1 to 4). In a technique described in Patent Document 1, a sample is arranged so that an X-ray irradiation position from the X-ray irradiation means is the rotation axis, and a direction of the main distortion is detected as the relationship between the rotation angle of the sample and the diffraction angle. In a technique described in Patent Document 2, an arbitrary part on the sample is disposed on the optical path of the incident X-ray beam at an arbitrary angle, and the residual stress is measured using an X-ray diffraction apparatus for rotating the sample with the optical axis of the incident X-ray beam as a rotation axis.

Further, in a technique described in Patent Document 3, by adjusting the position of the fluorescent plate on the uniaxial stage and the spot position of the laser displacement meter, the rotation axis of the $\psi$ axis is always positioned on the $\theta$ axis corresponding to each change of the inclination angle $\psi$. In a technique described in Patent Document 4, the extraction angle of X-rays from an X-ray source is changed by rotating and inclining the X-ray source provided apart from the end of the X-ray incident arm around a rotation axis, and the incident X-rays to the sample can always be irradiated to the same irradiation position on the sample.

PATENT DOCUMENTS

Patent Document 1: JP-A-H03-269351
Patent Document 2: JP-A-H05-288616
Patent Document 3: JP-A-H07-260598
Patent Document 4: JP-A-H08-94549

As described above, various mechanisms have been proposed for aligning a micro area on a sample with a rotation axis. However, it has not been achieved to accurately and precisely correct the deviation of the beam irradiation position, which is caused when the angle of the machine shaft is changed, by a stable and objective method.

SUMMARY

The present disclosure has been made in view of such circumstances, and an object thereof is to provide a correction amount specifying apparatus, a method, a program and a jig capable of accurately and precisely correcting the deviation of the beam irradiation position due to changes in the machine shaft by a stable and objective method and irradiating X-rays to a constant position even if the sample rotates.

(1) In order to achieve the above object, the correction amount specifying apparatus of the present disclosure is a correction amount specifying apparatus for specifying a correction amount for a deviation of an X-ray irradiation position caused by rotation of a sample with respect to a measurement system, comprising a diffraction data storing section for storing a diffraction data including a combination of a diffraction angle of the irradiated X-rays with respect to the sample rotation angle and the sample surface height, the diffraction data being acquired by irradiating X-rays to a standard sample that is an aggregate of isotropic and stress free crystal particles, a correspondence relationship determining section for determining a first correspondence relationship based on the diffraction data, and a correction amount specifying section for specifying a correction amount of the sample surface height with respect to a desired sample rotation angle and a desired diffraction angle based on the first correspondence relationship.

(2) Further, for the correction amount specifying apparatus of the present disclosure, the sample rotation angle is at least one of an angle $\chi$ around an axis in a X-rays progressing direction perpendicular to a scattering vector and an angle ω around an axis in a direction perpendicular to an optical path surface.

(3) Further, for the correction amount specifying apparatus of the present disclosure, the first correspondence relationship is a polynomial formula of the diffraction angle representing the correction amount of the sample surface height, and the polynomial formula has a polynomial formula of the sample rotation angle as a coefficient.

(4) The correction amount specifying apparatus of the present disclosure further comprises a sample position controlling section for controlling a relative position of the sample with the correction amount of the sample surface height with respect to the desired sample rotation angle and the desired diffraction angle.

(5) Further, the correction amount specifying apparatus of the present disclosure further comprises a reference position data storing section for storing a reference position data in a direction parallel to the sample surface measured using a jig whose position is controlled to be corrected in the sample surface height direction with respect to the desired sample rotation angle and the diffraction angle, wherein the correction amount specifying section specifies a correction amount in a direction parallel to the sample surface based on the reference position data with a second correspondence relationship.

(6) Further, for the correction amount specifying apparatus of the present disclosure, the second correspondence relationship is a polynomial formula of the diffraction angle representing a correction amount in a direction parallel to the sample surface, and the polynomial formula has a polynomial formula of the sample rotation angle as a coefficient.

(7) Further, the jig with a flat-plate shape for correcting a deviation of an X-ray irradiation position caused by rotation of a sample with respect to a measurement system, comprises a first region and a second region provided adjacent each other on the receiving surface and respectively formed of materials whose intensity of the scattered X-rays are different, wherein the jig is mounted on the X-ray diffraction apparatus so as to be able to measure the scattered X-ray intensity by scanning the irradiation position to cross the boundary between the first region and the second region.

(8) Further, in the jig of the present disclosure, the boundaries between the first region and the second region are straight lines perpendicular to each other.

(9) Further, in the jig of the present disclosure, the first region is formed of stainless steel and the second region is formed of Si.

(10) Further, in the jig of the present disclosure, the second region is formed of an aggregate of crystal particles.

(11) Further, the correction amount specifying method of the present disclosure is a correction amount specifying method for specifying a correction amount for a deviation of an X-ray irradiation position caused by rotation of a sample with respect to a measurement system, comprising the steps of acquiring a diffraction data including a combination of a diffraction angle of the irradiation X-rays with respect to the sample rotation angle and the sample surface height, the diffraction data being acquired by irradiating X-rays to a standard sample that is an aggregate of isotropic and stress free crystal particles, determining a first correspondence relationship based on the diffraction data, and specifying a correction amount of the sample surface height with respect to a desired sample rotation angle and a desired diffraction angle based on the first correspondence relationship.

(12) Further, the correction amount specifying program of the present disclosure is a correction amount specifying program for specifying a correction amount for a deviation of an X-ray irradiation position caused by rotation of a sample with respect to a measurement system, causing a computer to execute the processes of determining a first correspondence relationship based on a diffraction data including a combination of the diffraction angle of the irradiation X-rays with respect to the sample rotation angle and the sample surface height, the diffraction data being acquired by irradiating X-rays to a standard sample that is an aggregate of isotropic and stress free crystal particles, and specifying a correction amount of the sample surface height with respect to a desired sample rotation angle and a desired diffraction angle based on the first correspondence relationship.

DETAILED DESCRIPTION

Figure 1A:
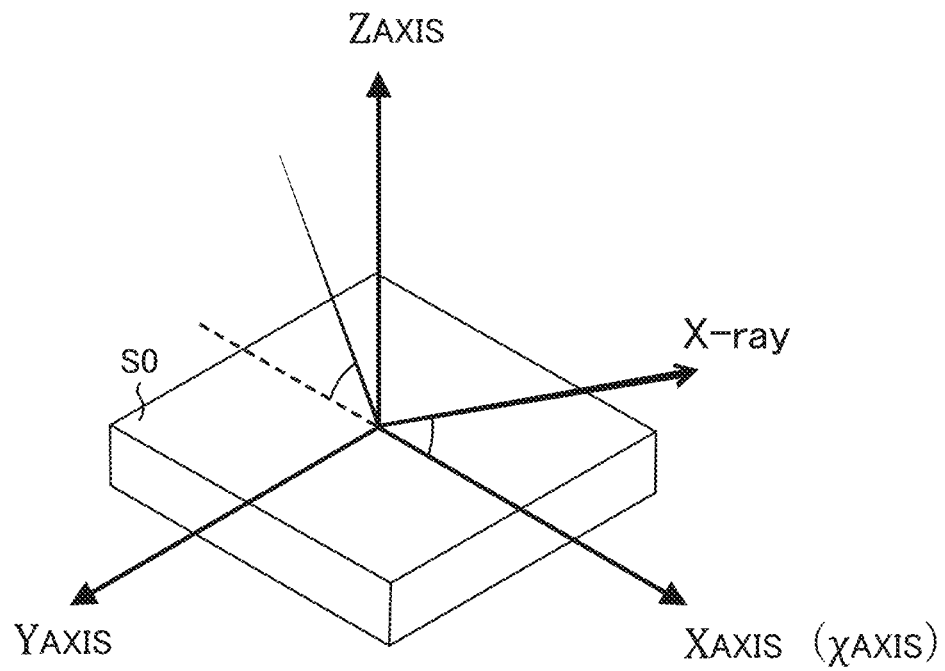
FIGS. 1A and 1B are respectively perspective views showing X, Y, and Z coordinates before and after rotation around the χ-axis.

Next, embodiments of the present disclosure are described with reference to the drawings. To facilitate understanding of the description, the same reference numerals are assigned to the same components in the respective drawings, and duplicate descriptions are omitted.

[Principle]

When performing X-ray diffraction measurement for a micro area of the sample, it is ideal as originally that the X-ray beam is irradiated at a point specified by the user, even if the angle of the machine shaft is changed. However, the irradiation position of the X-ray beam or the measurement position of the sample deviates from the reference position due to the deflection due to the machining accuracy or the deflection due to the weight of the shaft, etc.

The deflection and displacement of the machine shaft may be caused by several factors such as the accuracy of the machine shaft and the moment due to its own weight. However, in the conventional technique in which the irradiation position of the X-ray beam and the measurement position of the sample are also adjusted to the mechanical rotation axis position of each shaft, the positional deviation due to deflection or the like when the shaft is moved can not be adjusted. It is further difficult to adjust the positional deviation when both of them move.

In the present disclosure, instead of adjusting the position of the X-ray beam and the measurement position of the sample to the mechanical rotation axis position, the deviation of the irradiation position of the X-ray beam or the measurement position of the sample caused by tilting of the sample is corrected.

Figure 1B:
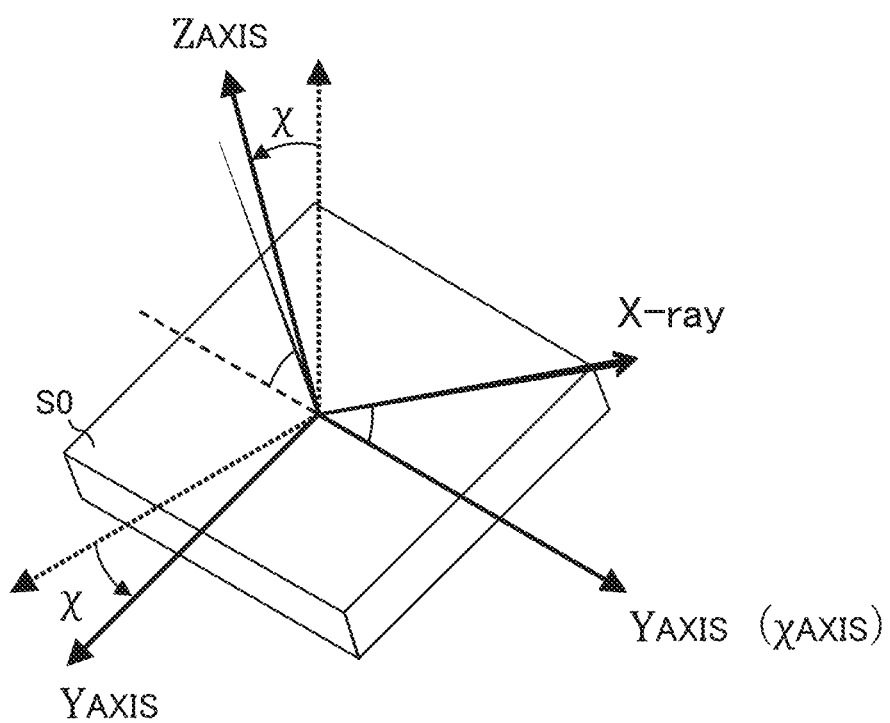

FIGS. 1A and 1B are respectively perspective views showing X, Y, and Z coordinates before and after rotation around the χ-axis. χ axis is an axis parallel to the optical path surface. The XYZ coordinates are coordinates based on the sample S0. The Z axis is perpendicular to the sample surface and the X and Y axes are parallel to the sample surface. The X-axis coincides with the χ-axis for rotation around the χ-axis. The Y-axis is perpendicular to the X-axis.

If the deviation of the beam irradiation position occurs due to χ-axis rotation, 2θ does not change even if the deviation in the X-axis direction occurs. When the deviation occurs in the Y-axis direction due to the χ-axis rotation, 2θ is changed with the change in the height Z of the sample surface irradiated with X-rays in accordance with the sample rotation angle χ around the χ-axis. Further, the beam irradiation position in the X-axis direction and Y-axis direction also deviates according to χ. If the deviation occurs in the Z-axis direction due to χ-axis rotation, 2θ angle is changed with the change in the height Z of the sample surface irradiated with X-rays. Further, the beam irradiation position in the X-axis direction and Y-axis direction also deviates according to χ.

Figure 2A:
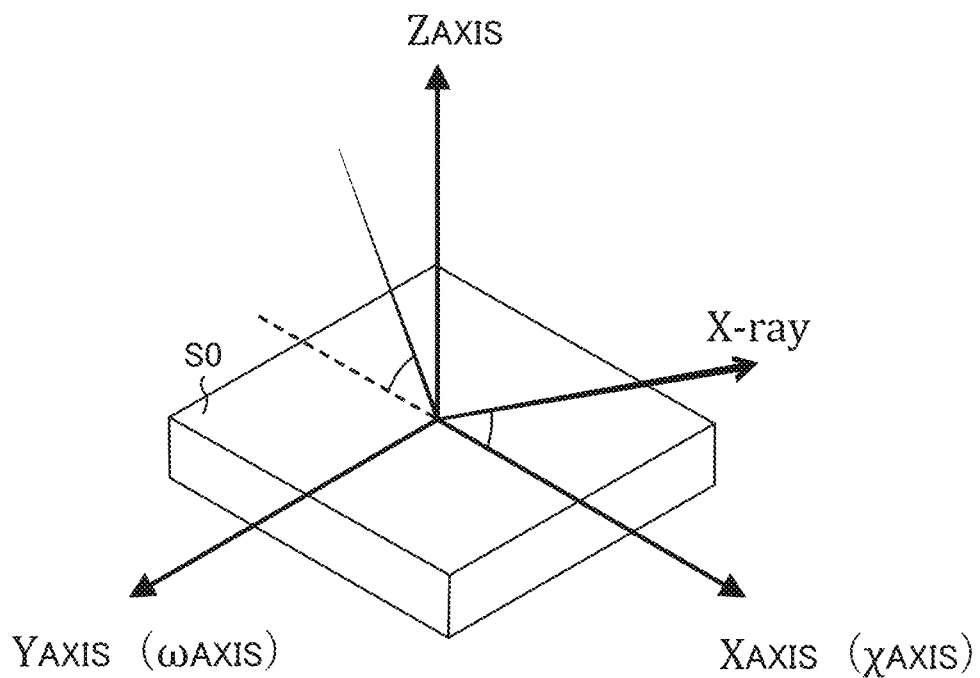
FIGS. 2A and 2B are respectively perspective views showing X, Y and Z coordinates before and after rotation around the ω-axis.
Figure 2B:
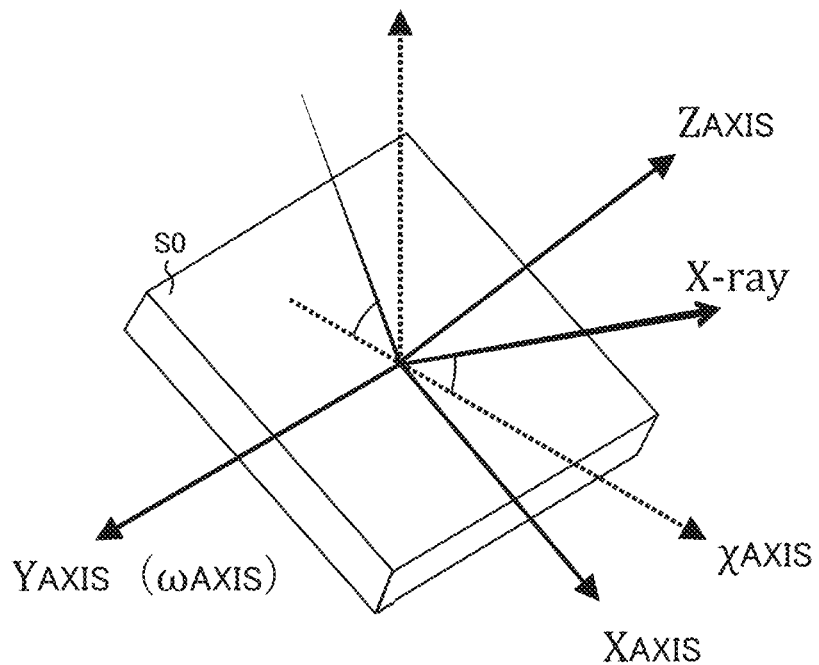

FIGS. 2A and 2B are respectively perspective views showing X, Y and Z coordinates before and after rotation around the ω-axis. ω axis is an axis in a direction perpendicular to the optical path surface. The Y-axis coincides with the ω-axis. If the deviation of the beam irradiation position in the X-axis direction occurs due to ω-axis rotation, 2θ is changed with the height Z of the sample surface irradiated with X-rays corresponding to the angle ω around the ω-axis. Further, the beam irradiation position in the X-axis direction also deviates according to ω.

When the deviation occurs in the Y-axis direction due to ω-axis rotation, the height Z of the sample surface irradiated with the X-ray corresponding to ω does not change and 2θ does not change. If the deviation occurs in the Z-axis direction due to ω-axis rotation, 2θ angle is changed with the change in the height Z of the sample surface irradiated with the X-ray corresponding to ω. Further, the beam irradiation position in the X-axis direction also deviates according to ω.

When a sample is placed on the stage of the sample stage, the surface of the sample to be measured may be inclined around the ω axis. In this case, since the measure is desired to be performed with keeping the normal line of the sample surface perpendicular to the χ axis, the sample is rotated around the ω axis to adjust the inclination of the sample, and then the sample is rotated around the χ axis to perform measurement. This adjustment is merely an operation of aligning the optical axis to the reference angle, but thereby the machine shaft changes its arrangement from the original one. If there is also deflection of the machine shaft at this time, since the deviation of the beam position occurs between when the sample tilts and does not tilt around the ω axis, it is necessary to perform correction based on the angular positions of both χ-axis and ω-axis.

In such a case as described above, the X-ray profile of the powder sample is acquired by moving the powder sample in the Z-axis direction so as to be able to correct the deviation. The movement of the sample is relative and may be either the movement of the sample or the movement of the entire goniometer including the X-ray source and the detector.

The sample surface is moved to the Z position to be any $2\theta$ angle in each $\chi$ while the sample rotation angle $\chi$ is changed at an arbitrary angular interval. At that time the X-ray irradiation position does not deviate in the Z-axis direction in each $\chi$. This is because the deviation in the X-axis direction does not affect the peak position of the X-ray profile with respect to the powder sample. By acquiring a height Z to form an arbitrary diffraction angle $2\theta$ at each sample rotation angle from the relationship between $2\theta$ and Z, it is possible to correct the influence of the height deviation due to the deviation of the rotation axis and the beam irradiation position.

Figure 3:
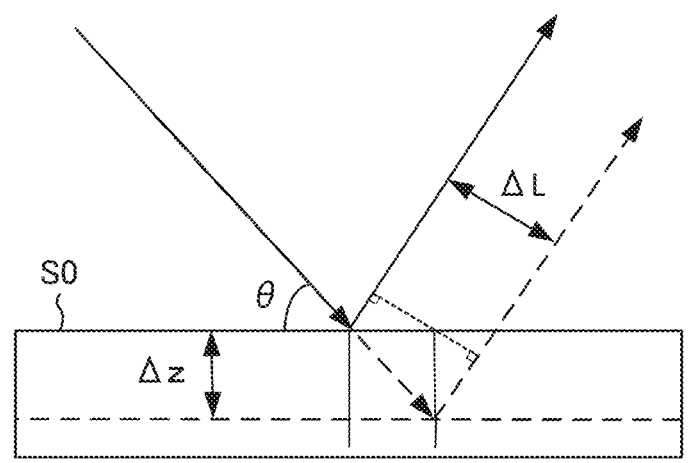
FIG. 3 is a schematic diagram showing the change of the sample surface height caused by the deviation of the beam irradiation position and the error of the diffraction angle.

FIG. 3 is a schematic diagram showing the change of the sample surface height caused by the deviation of the beam irradiation position and the error of the diffraction angle. As shown in FIG. 3, by the sample surface height Z is changed with the deviation of the beam irradiation position, a change in $\Delta 2\theta = \tan-1$ ($\Delta$L/camera length) also occurs in $2\theta$.

As in FIG. 3, when the X-ray irradiation position in the Y-axis direction is deviated, the X-ray irradiation position in the Y-axis and Z-axis directions also changes by the change of the sample rotation angle $\chi$. Then, the height position Z should originally be kept same even if the angle of the $\chi$-axis changes, but it changes, and $2\theta$ angle also changes. Therefore, the position of the sample is adjusted to the X-ray irradiation position in irradiation at an arbitrary $\chi$. It is possible to correct the deviation of the X-ray irradiation position by adjusting the sample or the goniometer including the X-ray source and the detector in the Z-axis and Y-axis direction, if it is deviated as shown in FIG. 3.

In order to correct the deviation of the Z axis, the deviation amount is recognized from the tendency of the change of the $2\theta$ angle when the Z axis is changed for each angle of the $\chi$ axis by using the powder sample. Since an unstrained powder sample is used, the diffraction angle $2\theta$ is unchanged even at the different sample rotation angles $\chi$. Therefore, it is effective to determine the relationship between $2\theta$ and Z measured with reference to the same diffraction plane.

The rotation of the sample with respect to the measurement system, which causes the above-described deviation of the X-ray irradiation position, means relative rotation between the measurement system and the sample. That is, rotation of the sample relative to the measurement system includes not only rotation of the sample but also rotation of the measurement system.

First Embodiment (Configuration of Entire System)

Figure 4:
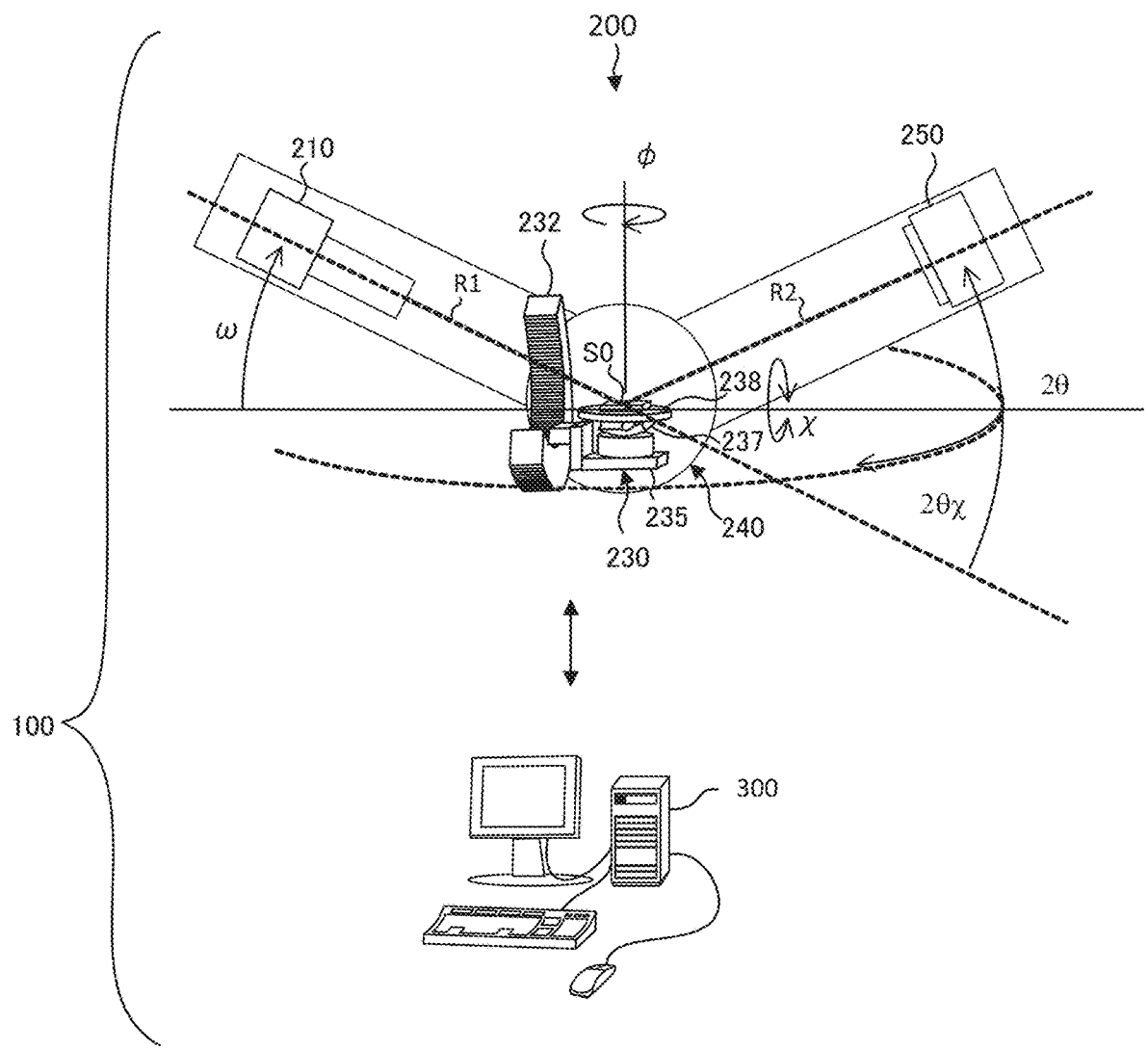
FIG. 4 is a schematic diagram showing the configuration of X-ray measurement system.

FIG. 4 is a schematic diagram showing a configuration of the X-ray measurement system 100. The X-ray measurement system 100 includes an X-ray diffraction apparatus 200 and a computer 300 (correction amount specifying apparatus). The respective apparatuses and the respective sections are connected by wire or wireless, and can transmit and receive control information, measurement data, and the like. The computer 300 may be placed on a cloud.

(Configuration of X-ray Diffraction Apparatus)

The X-ray diffraction apparatus 200 includes an X-ray irradiation section 210, a sample stage 230 and a detector 250. The X-ray diffraction apparatus 200 is used for X-ray diffraction measurement and is controlled by a computer 300. The diffraction data acquired by the X-ray diffraction apparatus 200 is transmitted to the computer 300.

The X-ray irradiation section 210 generates X-rays and irradiates the sample with the generated X-rays. The X-rays in the generation stage may be monochromatic X-rays or may be filtered into monochromatic X-rays along a path up to the incident on the detector 250. The configuration is achieved so that the diffraction data by the monochromatic X-ray can be detected at least in the detection stage. By irradiating the sample with monochromatic X-rays, it is possible to simultaneously detect diffracted beams that differ according to the lattice plane distances. As the monochromatic X-ray, it is preferable to use CuK$\alpha$ rays. The X-ray irradiation section 210 is provided with a collimator or the like, it is preferable that the beam size can be adjusted depending on the size of the crystal grains of the sample.

The sample stage 230 mounts a sample S0 thereon and can be adjusted to fix a measurement object to be irradiated with X-rays to a specific position. The sample stage 230 can operate an adjustment mechanism having a motor or the like by the control signal from the computer 300 as shown in FIG. 4. As a result, the position adjustment can be performed to adjust $\chi$-axis rotation, $\omega$-axis rotation, X-axis movement, Y-axis movement and Z-axis movement with respect to the sample S0. Details of the adjusting mechanism are described below. The incident X-ray R1 is radiated from the X-ray irradiation section 210, to generate a diffracted beam R2 by diffraction at the irradiation position of the sample S0. The angle of the diffracted beam R2 with respect to the incident X-ray R1 can be expressed by $2\theta$. In the correction control, the same movement may be performed in other axes instead of the movement in the XYZ axes.

The detector 250 generates an electrical signal according to the intensity of X-rays incident on the detection surface. Thus, it is possible to detect the diffracted beam caused by the sample S0. The detector 250 is preferably a two-dimensional detector for ease of peak detection. A semiconductor detector can be used as the detector 250. The position of the detector 250 can be adjusted by control signals from the computer 300.

(Adjustment Mechanism)

The sample stage 230 includes abase section 235, ahead section 237, and a sample plate 238. The $\chi$ cradle 232 (X-axis adjusting mechanism) and the base section 235 are integrated with each other, and the entire sample table can be swung along the cradle 232. The base section 235 has a Z-axis adjusting mechanism and $\varphi$-axis rotation mechanism. The Z-axis adjustment mechanism adjusts the height of the sample S0. The $\varphi$-axis rotation mechanism rotates the sample S0. The head section 237 can be removed and replaced depending on the measurement application. In the head section 237, XY axis adjusting mechanism is provided to allow parallel movement to the stage surface. The head section 237 is configured such that the sample plate 238 is attached to an upper part thereof.

A goniometer 240 shown in FIG. 4 has an incident-side arm and an emission-side arm. The incident-side arm supports the X-ray irradiation section 210, the emission-side arm supports the detector 250. Furthermore, $\omega(\theta s)$ rotation system rotating in the vertical direction (arrow $\omega$ direction) of the sample surface is connected to the incident-side arm. Further, $2\theta$ ($\theta d$) rotation system which rotates with respect to the vertical direction (arrow $2\theta$ direction) of the sample surface, and $2\theta\chi$ rotation system which rotates with respect to the horizontal direction (arrow $2\theta\chi$ direction) of the sample surface is connected to the emission-side arm. The goniometer 240, for example, is configured to be capable of scanning five axes ($\omega$, $\chi$, $\varphi$, $2\theta$ and $2\theta\chi$ axes) as a measurement axis.

The φ axis is an in-plane rotation axis (axis perpendicular to the surface) of the stage on which the sample is placed. The ω-axis is an axis for controlling the angle of X-rays incident on the sample surface by controlling the posture of the sample or X-ray source. The χ axis is an axis for controlling the inclination (=tilt) of the sample reference plane in a direction perpendicular to the direction in which X-rays progresses when the ω value is 0°.

(Configuration of Jig)

Figure 5A:
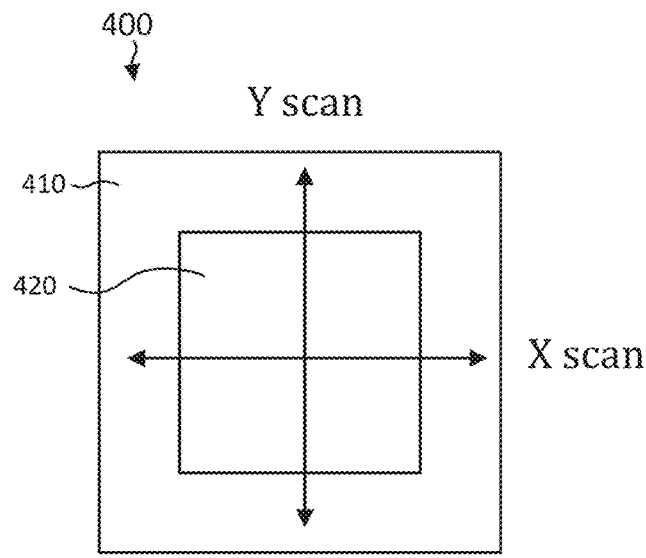
FIGS. 5A to 5C are respectively a plan view showing an example of the jig and graphs showing the intensities of the scattered rays when X and Y scans of the beam irradiation position are performed on the jig.
Figure 5B:
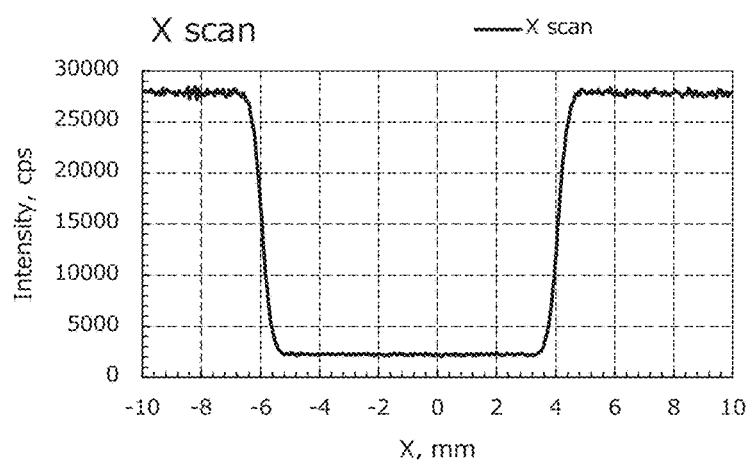
Figure 5C:
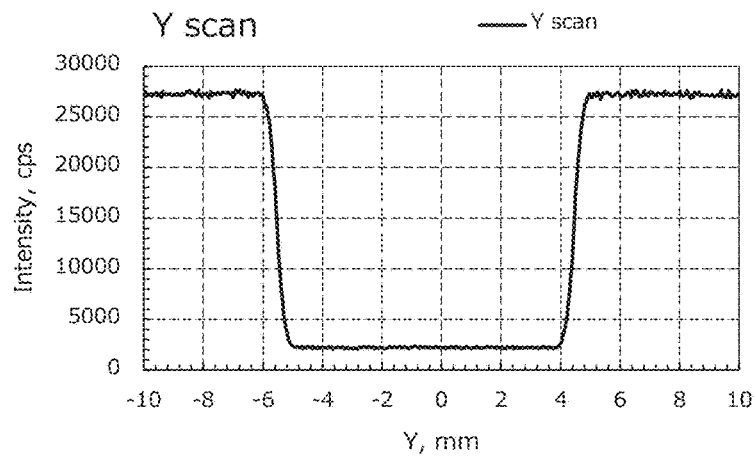

It is preferable to use a jig for correction of the beam irradiation position in the XY direction. FIGS. 5A to 5C are respectively a plan view showing an example of the jig 400 and graphs showing the intensities of the scattered rays when X and Y scans of the beam irradiation position are performed on the jig 400. The jig 400 is formed in a flat plate shape and is used for correcting a deviation of the X-ray irradiation position caused by rotation of the sample with respect to the measurement system. The jig 400 is composed of, for example, a first region and a recess forming a second region, and the recess is filled with a standard sample. The jig 400 is mounted to the X-ray diffraction apparatus so as to be able to measure the scattered X-ray intensity by scanning the irradiation position so as to cross the boundary between the first region and the second region.

The jig 400 comprises a first region 410 and a second region 420, which are formed of materials to emit different intensities of fluorescent X-rays by X-rays irradiation, adjacent to each other on the receiving surface. Thus, the beam irradiation position on the sample can be determined based on the position of the boundary formed by the first region 410 and the second region 420. The first region 410 forms a frame part surrounding the central part, the second region 420 forms a square central part.

The boundary between the first region 410 and the second region 420 preferably has orthogonal straight lines. Thus, the boundary of the orthogonal lines can be used as reference positions in the X and Y direction. The first region 410 is preferably formed of stainless steel, and the second region 420 is preferably formed of Si. Thus, the boundary can be easily searched for based on the difference in the emission amount of the fluorescent X-rays with respect to the characteristic X-rays of Cu in particular. Instead of the characteristic X-rays of Cu, X-rays of other wavelengths may be irradiated. Further, the materials of the first region 410 and the second region 420 may be any combination capable of recognizing the boundary from the difference in the amount of emission of the fluorescent X-rays generated according to the wavelength of the irradiation X-rays and may be formed of a material different from those described above respectively.

It is further preferable that the second region 420 forms a flat receiving surface and is formed of an aggregate of isotropic and stress free crystal particles. As a result, the second region 420 can be used as a standard sample which has a flat surface and no distortion and keeps a constant diffraction angle even with respect to the rotation of the sample.

Figure 6A:
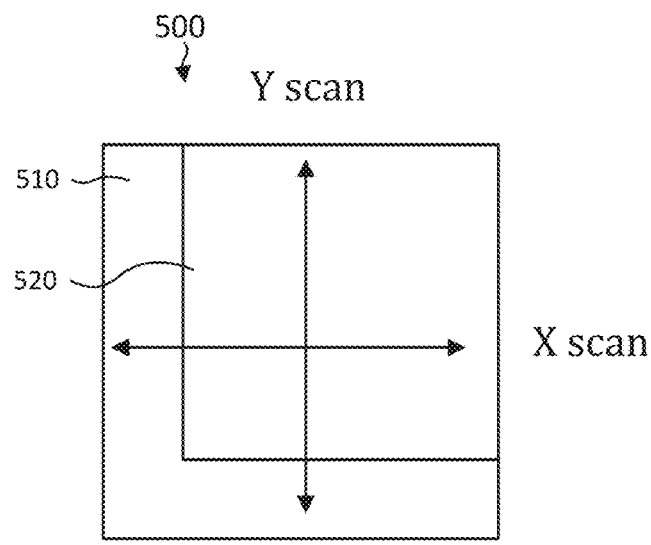
FIGS. 6A to 6C are respectively a plan view showing an example of the jig and graphs showing the intensity of the scattered rays when X and Y scans of the beam irradiation position are performed on the jig.
Figure 6B:
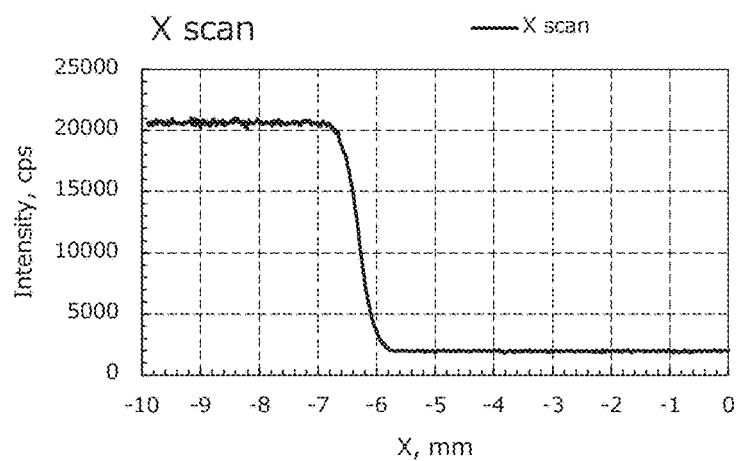
Figure 6C:
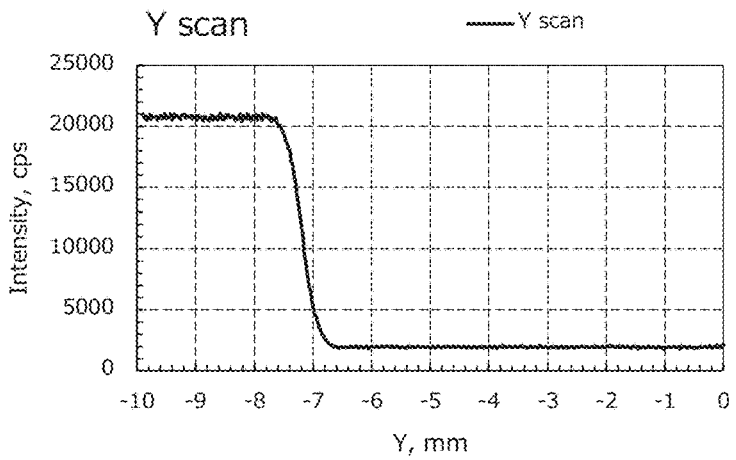

In the above example, the first region surrounds the central part, but the first region may be formed only on one side in the X direction and one side in the Y direction. FIGS. 6C to 6A are respectively a plan view showing an example of the jig 500 and graphs showing the intensity of the scattered rays when X and Y scans of the beam irradiation position are performed on the jig.

The jig 500 comprises a first region 510 and the second region 520 on the receiving surface, and the material and other features are the same as those of the jig 400 described above. However, the first region 510 exists only on one side in the X direction and on one side in the Y direction and is formed in an L shape. Even in such a configuration, it is possible to correct the beam irradiation position with reference to the position of the boundary formed by the first region 510 and the second region 520.

Figure 7A:
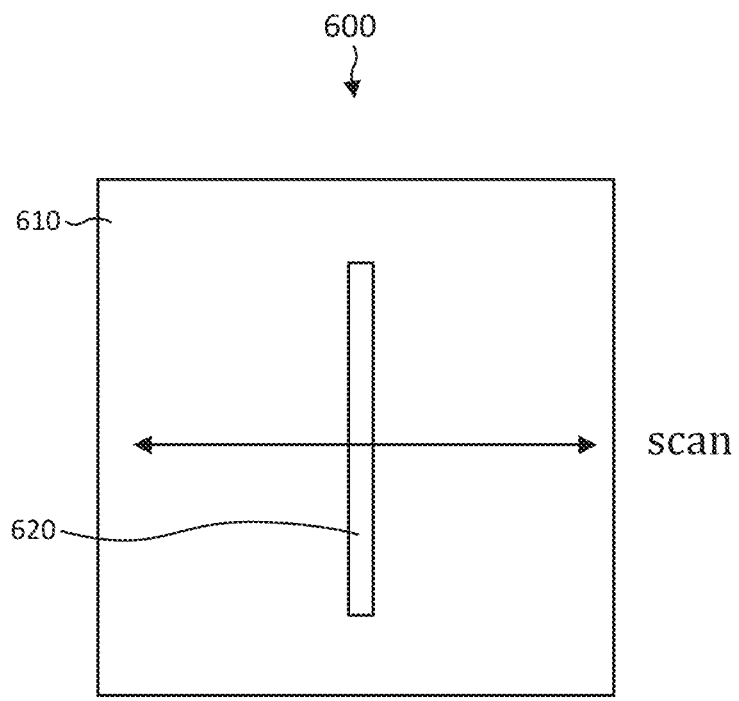
FIGS. 7A and 7B are respectively a plan view showing an example of the jig and a graph showing the intensity of the scattered rays when scans of the beam irradiation position in a certain direction is performed on the jig.
Figure 7B:
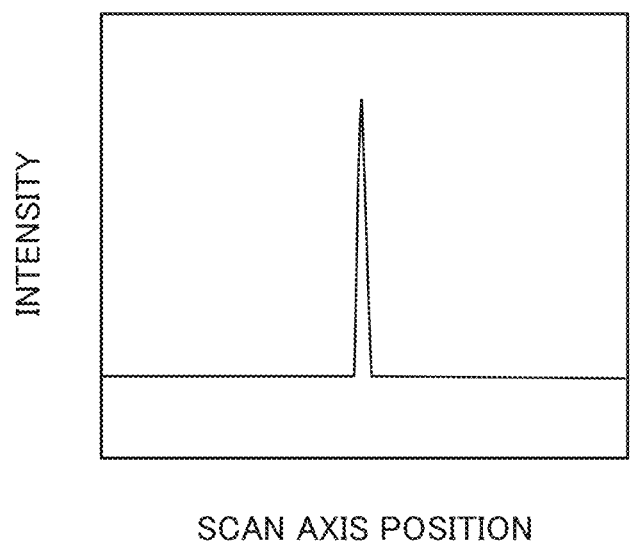

The example of the jig described above enables scanning in two directions with one time Installation but enables scanning only in one direction. FIGS. 7A and 7B are respectively a plan view showing an example of the jig 600 and a graph showing the intensities of the scattered rays when scans of the beam irradiation position in a certain direction is performed on the jig.

The jig 600 comprises a first region 610 and the second region 620 on the receiving surface, and the material and other features are the same as those of the jig 400 described above. However, the jig 600 is formed so that the first region 610 surrounds the rectangular second region 620. In such a configuration, after scanning in a direction transverse to the boundary formed by the first region 610 and the second region 620, by changing the orientation of the jig 600 by 90° to scan in a direction transverse to the boundary again and identify the reference position, the beam irradiation position based on the reference position can be corrected.

Figure 8A:
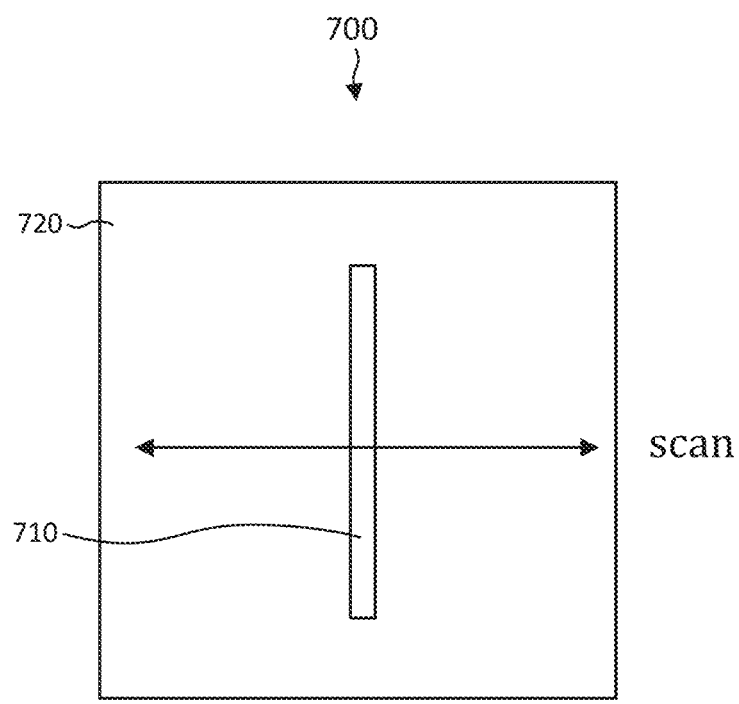
FIGS. 8A and 8B are respectively a plan view showing an example of the jig and a graph showing the intensities of the scattered rays when scans the beam irradiation position in a certain direction is performed on the jig.
Figure 8B:
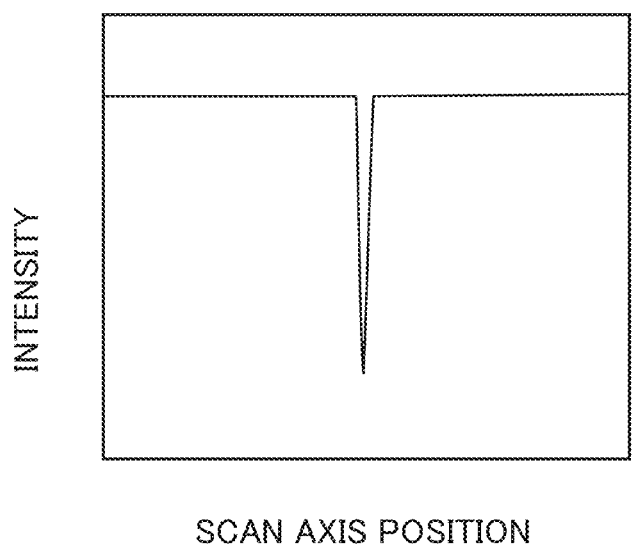

FIGS. 8A and 8B are respectively a plan view showing an example of the jig 700 and a graph showing the intensities of the scattered rays when scans the beam irradiation position in a certain direction is performed on the jig. The jig 700 is formed so that the second region 700 surrounds the rectangular first region 710. The jig 700 can be used in the same manner as the jig 600.

Figure 9:
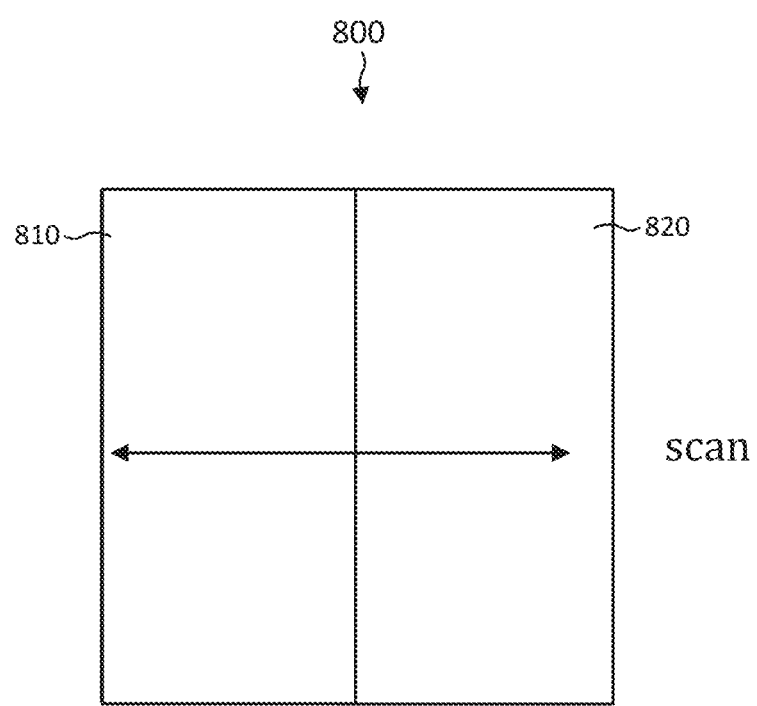
FIG. 9 is a plan view showing an example of the jig.

A jig in which a region is simply divided into two by one boundary may be used. FIG. 9 is a plan view showing an example of the jig 800. The jig 800 is configured to divide a region into a first region 810 and a second region 820 by one boundary. The jig 800 can also be used in the same manner as the jigs 600 and 700.

(Configuration of Correction Amount Specifying Apparatus)

Figure 10:
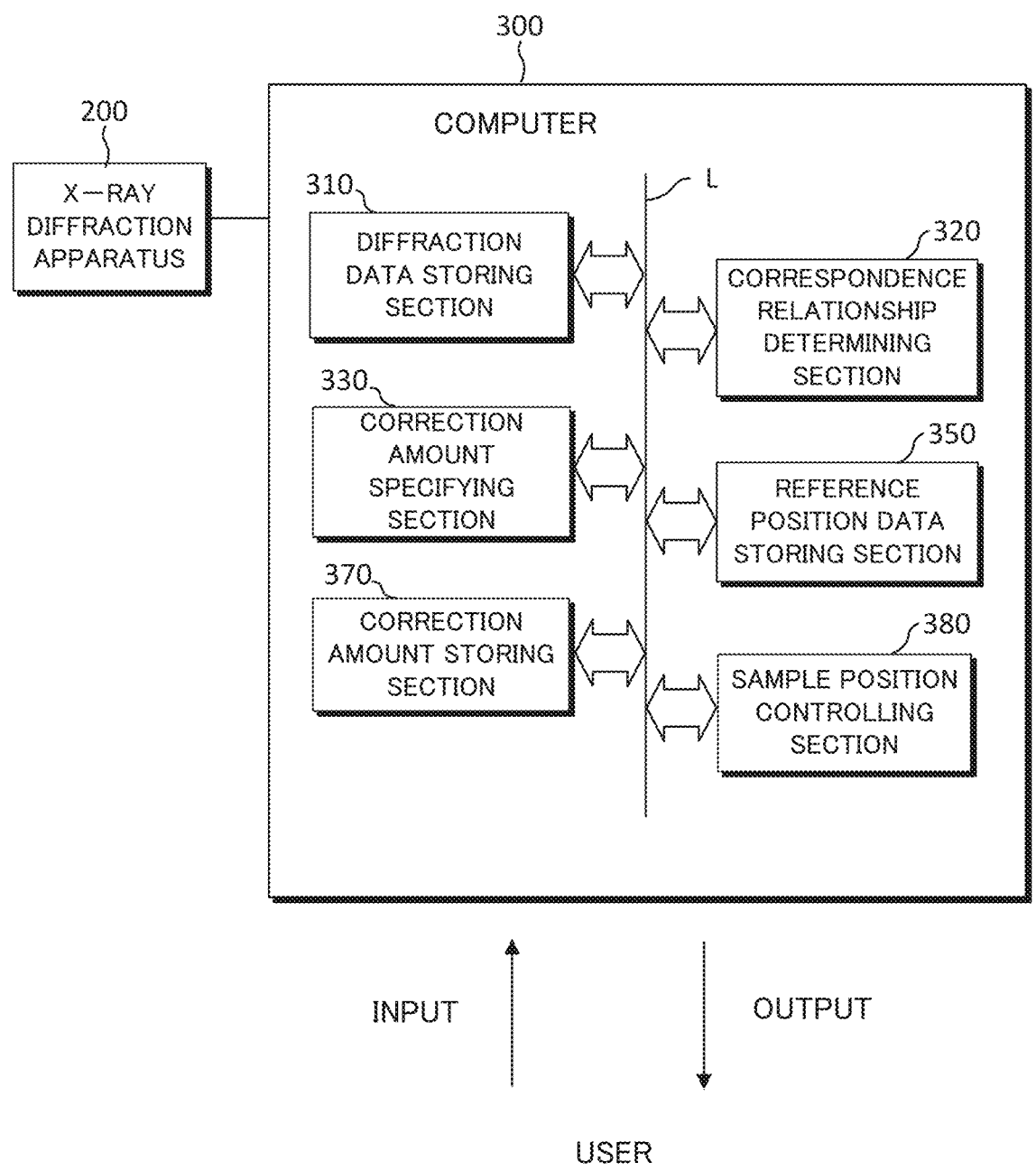
FIG. 10 is a block diagram showing the configuration of the X-ray measurement system.

FIG. 10 is a block diagram showing the configuration of the X-ray measurement system 100. The computer (correction amount specifying apparatus) 300 is, for example, a PC and is composed of a processor for executing processes and a memory or a hard disk for storing programs and data. For example, the functionality of the elements disclosed herein (e.g., computer 300) may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor. The computer 300 controls the X-ray diffraction apparatus 200 and processes the measurement data. The computer 300 receives input from the user through the input device and outputs the information to the user through the output device.

The computer 300 is composed of a diffraction data storing section 310, a correspondence relationship determining section 320, a correction amount specifying section 330, a reference position data storing section 350, a correction amount storing section 370, and a sample position controlling section 380 and specifies a correction amount for a deviation of the X-ray irradiation position caused by rotation of the sample.

The diffraction data storing section 310 stores the diffraction data consisting of a combination of the diffraction angle of the irradiation X-rays with respect to the sample rotation angle and the sample surface height, which has been acquired by irradiating X-rays to a standard sample of an aggregate of crystal particles.

The correspondence relationship determining section 320 determines a correspondence relationship relating the sample height to the sample rotation angle and the diffraction angle based on the diffraction data. The correspondence relationship is preferably a function, more preferably an approximate formula acquired by fitting to diffraction data. The approximate formula has a polynomial expression of the sample rotation angle as a coefficient, it is preferable that the polynomial of the diffraction angle for calculating the sample position. As a result, an approximate formula can be easily determined by fitting. The correspondence relationship may be one associated with the correction amount itself acquired from the actual measurement with respect to the sample rotation angle and the diffraction angle.

The correction amount specifying section 330 specifies the sample surface height as the correction amount in the Z direction with respect to the desired sample rotation angle and the diffraction angle according to the first correspondence relationship. The sample rotation angle is the sample rotation angle $\chi$ around the axis of the progressing direction of X-rays perpendicular to the scattering vector or the angle $\omega$ around the axis of the direction perpendicular to the optical path surface. The correction amount specifying section 330 preferably calculates the correction amount in the Z direction using the first function expressed by the mathematical expression as the first correspondence relationship, but the correction amount in the Z direction can also be specified based on the actually measured value.

The correction amount specifying section 330 specifies the correction amounts in the X direction and the Y direction based on the reference position data based on a second correspondence relationship. Thus, the correction amounts in the X direction and the Y direction can be specified. The correction amount specifying section 330 preferably calculates the correction amount in the X direction and the Y direction using the second function expressed by the mathematical expression as the second correspondence relationship, but the correction amounts in the X direction and the Y direction can also be specified based on the actual measurement values.

Thus, since the sample position can be corrected with respect to the sample rotation angle and the diffraction angle, the deviation of the beam irradiation position can accurately and precisely be corrected with a stable and objective method. As a result of the fact that X-rays can be irradiated to a specific position even when the sample is rotated, accurate and precise X-ray diffraction measurement can be performed on a micro area of the sample. Further, it is possible to improve the measurement accuracy of the X-ray diffraction apparatus.

The reference position data storing section 350 stores the reference position data in the X direction and Y direction parallel to the sample surface measured using a jig whose position in the Z direction is corrected and controlled by the correction amount in the Z direction with respect to the desired sample rotation angle and diffraction angle.

The correction amount storing section 370 stores the correction amount in each direction specified by the determined correspondence relationship. The sample position controlling section 380 drives the Z-axis adjusting mechanism of the base section 235 and the XY-axis adjusting mechanism of the head section 237 to control the relative position of the sample with the correction amount in each direction of X-axis, Y-axis and Z-axis, with respect to the desired sample rotation angle and diffraction angle. Thus, the deviation of the beam irradiation position caused according to the sample rotation angle can be corrected accurately and precisely by using the function or the calculated correction amount in each direction for the sample to be measured.

(Correction Controlling Method of Beam Irradiation Position)

Figure 11:
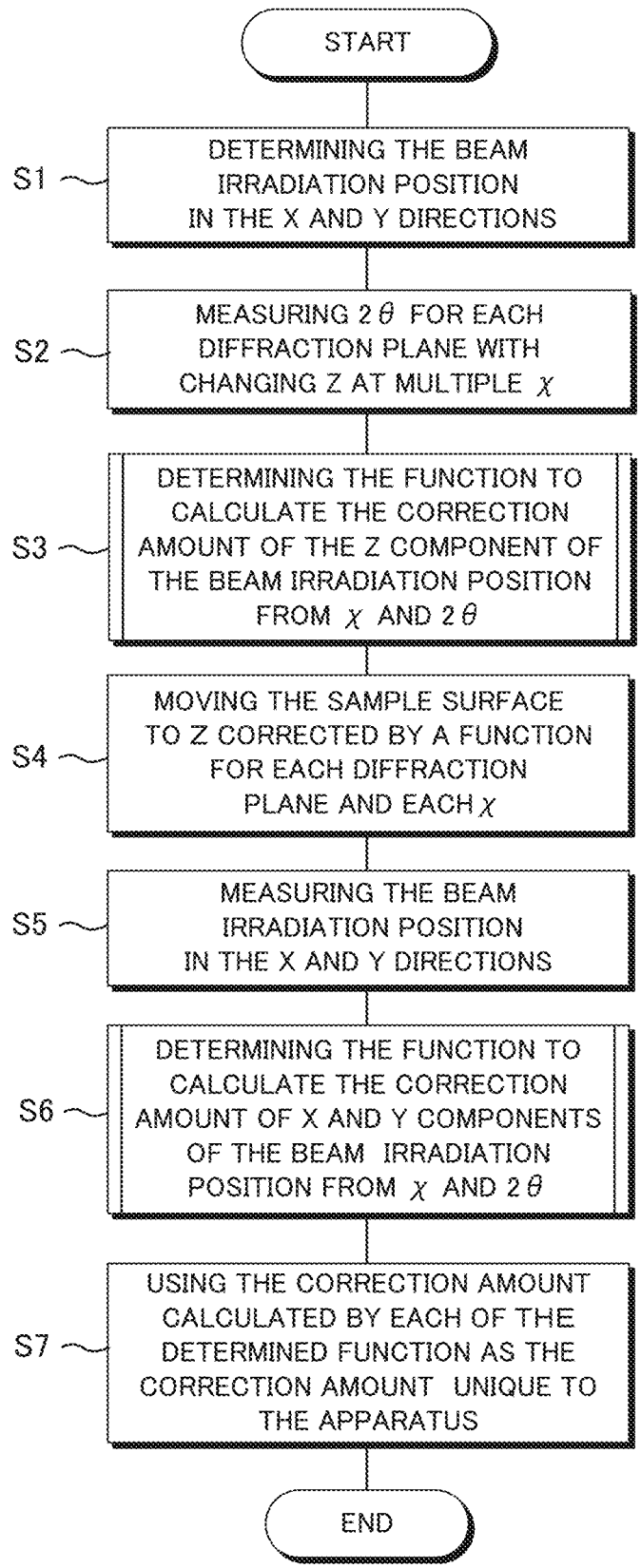
FIG. 11 is a flowchart showing the correction method of the beam irradiation position.

Next, the beam irradiation position can be corrected using the system configured as described above. Hereinafter, as an example, a correction method of the beam irradiation position when the sample rotation angle $\chi$ is changed is described. FIG. 11 is a flowchart showing a correction method of the beam irradiation position. First, the beam reference position in the X-direction and Y-direction is determined (step S1).

For example, the position determined by the measurement position determining mechanism for each apparatus can be a reference position. The measurement position determining mechanism includes a laser irradiation mechanism and a camera. Thus, the deviation between the position of the jig and the reference position is confirmed. When the correction in the XY direction is performed, the XY position of the beam irradiation position is determined using the position of the jig. Therefore, it is necessary to recognize the amount of deviation between the position of the jig and the reference position and make a correction formula based on the amount of deviation.

However, in the point of view of workability of the user and reproducibility of the work, the position of the jig is preferably adjusted to the reference position (the reference position of the apparatus). By performing the jig position adjustment at the time of shipment from the factory with such a method that reproducibility of mounting is increased, the work of confirming and inputting the deviation amount of the mounting position of the jig becomes unnecessary when the user adjusts them.

As for the amount of deviation, the center position of the powder sample at the center of the jig (second region) is determined by the confirmation procedure of the beam position in the XY direction. If the center position of the powder sample is deviated from the beam reference position (the position where the laser is irradiated or the position to be observed by the camera) at that time, it is necessary to add the amount of deviation to the correction formula.

For example, the center position of the second region of the jig can be determined by X-rays. On the other hand, the reference position on the X-ray diffraction apparatus 200 is recognized by a camera or a laser. For example, it is possible to confirm the amount of deviation in the XY stage using the camera of the X-ray diffraction apparatus 200. When a laser is used, the amount of deviation can also be confirmed by using a CCD camera from the outside of the X-ray diffraction apparatus 200.

Next, the diffraction angle 2θ is measured at a plurality of $\chi$ and sample surface height Z for each diffraction plane (step S2). When the measurement for the Si powder is performed by CuKα rays, there are 11 diffraction angles in the range of approximately 2θ=28° to 140°. Since 2θ angle is measured by the relationship of 2θ/θ and the incident angle θ is changed, the change in the beam position also reflected deflection of the machine shaft is measured.

When a powder sample is used as the standard sample, the diffracted beam is detected at the same diffraction angle 2θ even if χ changes. Furthermore, even if the beam irradiation position is shifted in the XY direction, the diffracted beam is obtained at the same diffraction angle 2θ. This is because the powder sample is strain-free. When changing the sample rotation angle χ for one diffraction plane, the diffraction angle 2θ is changed according to χ. This is because the sample surface height Z at which the beam is irradiated is changed by the deflection of the machine shaft.

With the deflection of the machine shaft and the change of the sample surface height Z, the beam irradiation position changes from a specific XY position. However, when a powder sample is used, the diffraction angle 2θ does not change according to a change in the beam irradiation position in the XY direction due to a deviation in the XY irradiation position. The diffraction angle 2θ is changed by the change in the Z direction. Therefore, the sample surface height Z at which the diffraction angle 2θ peculiar to the diffraction plane is measured is a sample surface height Z without deviation of the beam irradiation position due to deflection of the machine shaft or the like.

Then, the relational expressions of 2θ and Z are prepared in association with each χ, and the relationship is also approximated by using an optimum function (step S3). It would be also assumed the case where the amount of deviation of the rotation axis and the X-ray irradiation position is changed due to the change of the diffraction angle 2θ, the above relationship is obtained for a plurality of diffraction planes. The relationship between χ and each coefficient of the relational expression of 2θ and Z is determined based on the relational expression for all diffraction planes. Details are described below.

The corrected sample surface height Z at their angles is calculated by setting an arbitrary diffraction angle 2θ and χ based on the obtained function (first correspondence relationship). For any diffraction angle 2θ (incident angle θ) and any χ, the sample surface height Z is obtained at the same diffraction angle 2θ. At the obtained sample surface height Z, the height of the beam irradiation position would be the same. The corrected sample surface height Z is obtained at any χ at the diffraction angle 2θ from the low angle to the high angle. Then, the sample surface height is moved to the calculated Z (step S4).

Next, for each 2θ/θ, the XY position is confirmed with the change of χ (step S5). The XY position can be confirmed by the difference in intensity between the fluorescent X-rays of SUS and Si powder using a jig. Since it is not necessary to confirm at the diffraction angle, the confirmation can be performed at 2θ/θ of equal intervals from a low angle to a high angle. The equal intervals are preferable in order to effectively perform the approximation of the relationship between 2θ/θ, χ and XY positions in the correction of the beam irradiation position in the XY direction. Further, the range of 2θ/θ from the low angle to the high angle is preferable to be the angle range actually used for measurement.

The beam irradiation position in the XY direction is determined at the corrected sample surface height Z for each χ and each diffraction angle 2θ. At the Z-axis position obtained from the sample rotation angle χ and the 2θ angle of the sample used in the measurement, the deviation of the X-ray irradiation position in the X-axis and Y-axis directions at a plurality of χ is confirmed and measured using fluorescent powder, photosensitive paper or a jig capable of specifying the X-ray irradiation position. For the relationship between the deviation amount in the X-axis and Y-axis directions and χ, fitting of the function is performed to determine the approximate formula (second correspondence relationship) (step S6). The deviation amount in the X-axis and Y-axis directions is obtained based on arbitrary diffraction angle 2θ and χ used in the measurement using the relational expression.

When the deviation of the X-ray irradiation position is changed by the change of the diffraction angle 2θ, the deviation of the X-ray irradiation position in the X-axis and Y-axis directions at a plurality of χ is confirmed and measured for a plurality of diffraction planes. The relationship between χ and each coefficient of the relational expression of 2θ and χ, and the relationship between χ and each coefficient of the relational expression of 2θ and Y are obtained based on the relational expression for all diffraction planes. Each coefficient of the relationship between 2θ and X and each coefficient of the relationship between 2θ and Y are obtained according to χ used for measurement, the deviation amount in the X-axis and Y-axis directions at each χ is determined according to the 2θ angle of the measurement object.

Specifically, X-scan and Y-scan are performed using the driving mechanisms of the XY stage at each 2θ/θ and each χ to measure the X-ray fluorescence intensity of SUS and Si powder. The jig 400 is scanned with trace of traversing the Si powder in the order of SUS, Si powder and SUS. Then, the center position of the XY direction in the jig is determined by determining the center of the low intensity region. When the beam is deviated, the coordinates of the XY center position of the standard sample are changed. The jig 500 is scanned with trace from SUS to Si powder to confirm the edge of the boundary. Since the distance to the edge changes when the beam irradiation position deviates, the current beam irradiation position is obtained.

Instead of the XY scan of the X-ray intensity as described above, the X-ray irradiation position may be confirmed by a camera or the like using a fluorescent powder or a photosensitive paper, and the position may be numerically quantified by image processing or the like. Alternatively, using a laser or the like, the optical path of the laser is aligned with the optical path of the X-ray, the laser irradiation position is confirmed by a camera or the like, and the position may be numerically quantified by image processing or the like.

Then, the correction formula of the sample surface height Z and the correction formula of the XY position are stored as a correction formula unique to the apparatus (step S7). Thus, the XZ position can be corrected with changes in the incident angle θ, and the deviation of the rotation axis of the ω-axis and the beam irradiation position can also be corrected. For example, by registering the correction formula in the software, it is possible to correct the position of the beam or the sample to the XYZ position obtained according to the incident angle θ and the sample rotation angle χ determined from the measurement conditions.

It is preferable for the manufacturer to perform all steps prior to shipment. In the case, when the measurement system is changed, the user does not need to determine the beam reference position and check the deviation of the jig position and the beam reference position.

(Method of Determining Correspondence Relationship in Z-Direction)

Figure 12A:
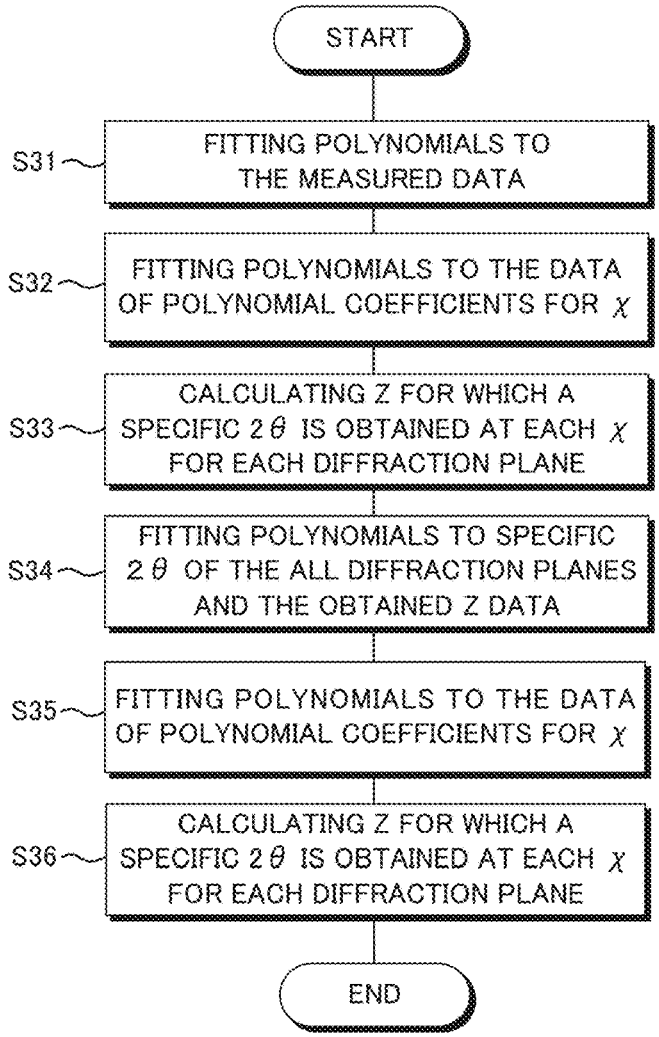
FIGS. 12A and 12B are respectively flowcharts showing a method for determining the correspondence relationships of the correction amounts in the Z-direction and the XY-direction.

FIG. 12A is a flowchart showing a method for determining the correspondence relationship of the correction amount in the Z direction (corresponding to step S3 in FIG. 11). For each diffraction plane, the polynomial formula is fitted to the relationship between the diffraction angle 2θ at each χ and the sample surface height Z (step S31).

Function such as a linear function, a quadratic function, or a cubic function is selected according to the distribution of the measured deviation. The functional form is preferably selected automatically but may be selectable by the user. However, since the sample surface height Z is a linear change in the uniaxial direction, it is presumed that a linear function or a quadratic function can sufficiently approximate. Since the relationship between the diffraction angle 2θ and the sample surface height Z for each sample rotation angle χ of each diffraction plane (hkl) holds, their slopes and intercepts are the coefficients for each diffraction plane and each χ.

$$2\theta^{hkl} = A_\chi^{hkl} + B_\chi^{hkl} \tag{1}$$

The polynomial formula is fitted to the relationship between the coefficient of the polynomial formula and the sample rotation angle χ obtained for each diffraction plane (step S32). For example, for each of the slope $A_\chi$ and the intercept $B_\chi$, the following χ polynomial formula can be fitted.

$$A_\chi^{hkl} = a_{slope}^{hkl} X^2 + b_{slope}^{hkl} X + c_{slope}^{hkl} \tag{2}$$

$$B_\chi^{hkl} = a_{intercept}^{hkl} X^2 + b_{intercept}^{hkl} X + c_{intercept}^{hkl} \tag{3}$$

Based on these approximate formulas, the sample surface height Z at any χ where the same diffraction angle 2θ is obtained in the vicinity of the intercept $B_\chi^{hkl}$ (diffraction angle 2θ) is determined.

Next, based on the approximate formula for each diffraction plane, arbitrary diffraction angle 2θ and χ are set to determine the sample surface height Z so that any diffraction angle 2θ holds (step S33). The following functions are obtained from formulas (1) to (3).

$$Z^{hkl} = \frac{2\theta^{hkl} - a_{intercept}^{hkl} \chi^2 + b_{intercept}^{hkl} \chi + c_{intercept}^{hkl}}{a_{slope}^{hkl} \chi^2 + b_{slope}^{hkl} \chi + c_{slope}^{hkl}} \tag{4}$$

The determined Z changes when the diffraction angle 2θ is changed. This is not the influence of the diffraction angle 2θ, but the influence of the X-ray incident angle θ. For convenience, it is represented by 2θ, but strictly, it is preferably represented by θ as follows.

$$Z^{hkl} = \frac{\theta^{hkl} - (a_{intercept}^{hkl} \chi^2 + b_{intercept}^{hkl} \chi + c_{intercept}^{hkl})/2}{(a_{slope}^{hkl} \chi^2 + b_{slope}^{hkl} \chi + c_{slope}^{hkl})/2} \tag{5}$$

The sample surface height Z is determined for each diffraction plane, and plotted for each χ. Then, based on the sample surface height Z at any χ of each diffraction plane obtained, for each χ, the polynomial formula such as for example formula (6) to the data of the relationship between the diffraction angle 2θ of each diffraction plane and the sample surface height Z (step S34). As the polynomial formula, a linear function, a quadratic function, a cubic function or the like can be selected. Since the deviation includes mechanical deflections of the χ-axis and the 2θ/θ-axis in multiplex, the most suitable function can not be determined uniformly but can preferably selected automatically or by the user.

$$Z = D_X \theta^2 + E_X \theta + F_X \tag{6}$$

With the data of the relationship between the coefficients of the polynomial formula and χ obtained in this manner, the following polynomial formula is fitted (step S35).

$$D_X = d_D X^3 + e_D X^2 + f_D X + g_D \tag{7}$$

$$E_X = d_E X^3 + e_E X^2 + F_E X + g_E \tag{8}$$

$$F_X = d_E X + e_E \tag{9}$$

Based on the above formulas (6), (7), (8), (9), the sample surface height Z where constant diffraction angle 2θ is obtained is calculated for any diffraction plane and any χ as follows (step S36). If the diffraction angle 2θ is determined at this time, the height of the beam irradiation position is determined.

$$Z=(d_D X^3+e_D X^2+f_D X+g_D)\theta^2+(d_E X^3+e_E X^2+f_E X+g_E)\theta+ (d_E X+e_E) \tag{10}$$

(Method for Determining Correspondence Relationship in X and Y Directions)

Figure 12B:
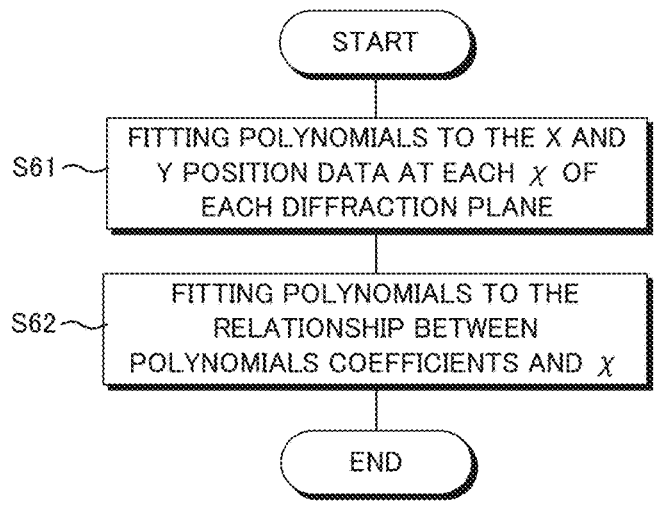

FIG. 12B is a flowchart showing a method for determining a correspondence relationship of the correction amounts in the XY directions (corresponding to step S6 in FIG. 11). The following polynomial formula is fitted to each data of the relationship between the diffraction angle 2θ and X position and the relationship between the diffraction angle 2θ and Y position for each χ according to the beam irradiation position in the XY direction obtained by the measurement (step S61).

$$X_X = H_X \theta^2 + I_X \theta + J_X \tag{11}$$

$$Y_X = L_X \theta^2 + M_X \theta + N_X \tag{12}$$

To the data of the relationship between χ and the coefficients of the polynomial formula obtained as an approximate formula, the following polynomial formula is fitted (step S62).

$$H_X = h_H X^3 + i_H X^2 + j_H X + k_H \tag{13}$$

$$I_X = h_I X^3 + i_I X^2 + j_I X + k_I \tag{14}$$

$$J_X = h_J X^3 + i_J X^2 + j_J X + k_J \tag{15}$$

$$L_X = h_L X^3 + m_L X^2 + n_L X + o_L \tag{16}$$

$$M_X = l_M X^3 + m_M X^2 + n_M X + o_M \tag{17}$$

$$N_X = l_N X^3 + m_N X^2 + n_N X + o_N \tag{18}$$

By setting the arbitrary diffraction angle 2θ and χ and using the obtained approximate formula, X position and Y position at their angles are respectively determined as follows. That is, formula (19) is obtained from formulas (11), (13) to (15). Formula (20) is obtained from formulas (12), (16), (17), and (18).

$$X_{jig}=(h_H X^3+i_H X^2+j_H X+k_H)\theta^2+(h_I X^3+i_I X^2+j_I X+k_I)\theta+ (h_J X^3+i_J X^2+j_J X+k_J) \tag{19}$$

$$Y_{jig}=(l_L X^3+m_L X^2+n_L X+o_L)\theta^2+(l_M X^3+m_L X^2+n_L X+o_L) \theta+(l_N X^3+m_N X^2+n_N X+o_N) \tag{20}$$

Then, by subtracting the deviation amount between the position of the jig and the reference position from the determined XY position, the corrected X position and Y position are respectively determined. That is, when the deviation amounts between the position of the jig and the reference position are expressed as ΔX, ΔY, formulas (21), (22) are obtained.

$$X = X_{jig} \Delta X = (h_H X^3 + i_H X^2 + j_H X + k_H) \theta^2 + (h_I X^3 + i_I X^2 + j_I X + k_I) \theta + (h_J X^3 + i_J X^2 + j_J X + k_J) \quad (21)$$

$$Y = Y_{jig} \Delta Y = (l_L X^3 + m_L X^2 + n_L X + o_L) \theta^2 + (l_M X^3 + m_L X^2 + n_L X + o_L) \theta + (l_N X^3 + m_N X^2 + n_N X + o_N) \quad (22)$$

(Measurement Method)

Using the correspondence relationship prepared or the correction amount calculated as described above, it is possible to perform X-ray diffraction measurement while correcting and controlling the beam irradiation position. First, the user sets the sample to the stage and inputs the measurement conditions such as the diffraction angle and the sample rotation angle. Then, the user instructs the start of measurement.

The corrected position in each direction of the XYZ is obtained based on the diffraction angle 2θ, the sample rotation angle ω and χ set as the measurement conditions. At this time, the function or the calculated correction amount is used as the correspondence relationship. The measurement is performed while the beam irradiation position is moved to the corrected position in each direction of XYZ.

If the measurement is with exposure and not with scanning, the measurement can sufficiently be performed after the movement toward the corrected position. Since it is necessary to correct the position in the XYZ direction in accordance with the movement of each sample rotation axis when the measurement is with scan, it is necessary to move the position in the XYZ direction in accordance with the movement of each sample rotation axis. In this case, feedback control is preferable. Although the correction is performed using a plurality of diffraction planes in the above example, it may be performed using only one diffraction plane. For example, such a method can be adopted in stress measurement.

Example (Verification of Correction Amount Specification)

An experiment was conducted on the above correction amount specifying method. An X-ray diffraction apparatus (SmartLab made by Rigaku) used for a long time was operated at 9 kW, and an optical unit for minute part was used for the incident optical system. Further, X-rays of CuKα having a beam diameter of about φ0.5 mm were used.

In order to confirm the deviation amount of the X-ray irradiation position in the X-axis and Y-axis directions, a jig in which Si powder and SUS are aligned in a direction perpendicular to the axial direction in the X-axis and Y-axis directions was used. The intensity of the scattered rays is scanned at each axis of the X-axis and Y-axis, the deviation of the X-ray irradiation position was confirmed based on the difference in the fluorescent X-ray intensity of the Si powder and SUS.

The deviation shown in the following table was able to be confirmed in the optical unit for minute part. This shows the deviation between the center position when the deviation amount of the XY axis was confirmed and the center position obtained by the correction formula, that is, the difference between the measured value and the calculated values based on the correction formula. Since the deviation in the X direction was ±0.05 mm or less with respect to the beam diameter of 0.5 mm, it was considered that the influence of the deviation was small on the measurement.

|  | X position | Y position |
|---|---|---|
| Maximum value | 0.039 mm | 0.009 mm |
| Minimum value | −0.045 mm | −0.008 mm |

Next, the beam irradiation position was aligned to the reference position, and the diffraction angle was measured by changing the Z at each χ for each diffraction plane. As the diffraction planes, (111), (220), (311), (400), (331), (422), (511), (440), (531), (620) and (533) were selected (hereinafter, the same). As the sample rotation angle χ, 0°, 6°, 12°, 18°, 24°, 30°, 36°, 42°, 48°, 54°, and 60° were selected (hereinafter, the same).

Figure 13:
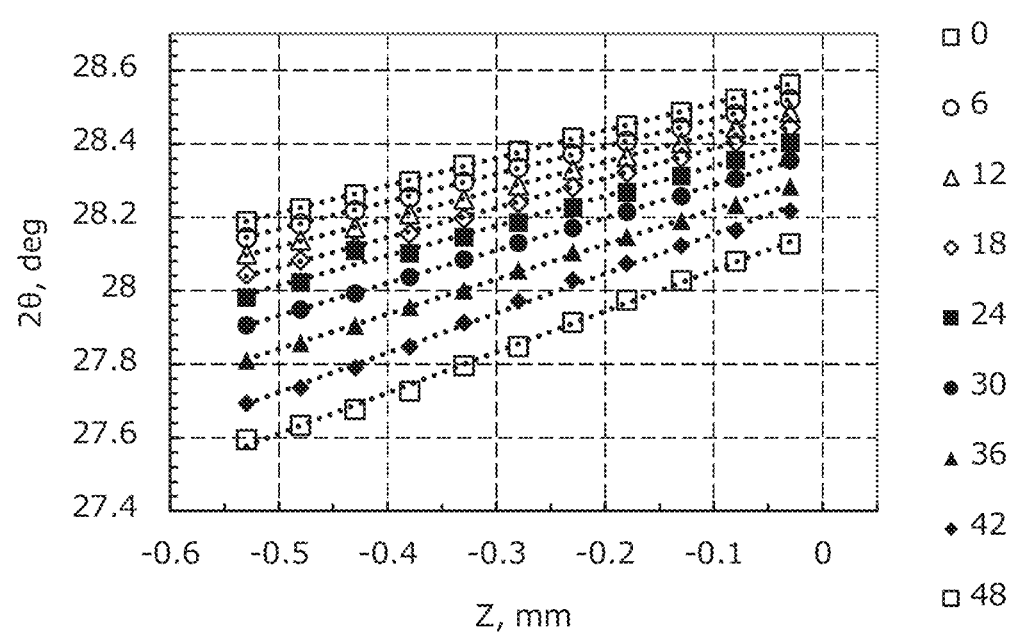
FIG. 13 is a graph plotting 2θ measured with changing Z for each χ on the diffraction plane 111 of the Si powder sample.

FIG. 13 is a graph plotting 2θ measured with changing Z for each χ on the diffraction plane 111 of the Si powder sample. Such plots were performed for each diffraction plane. The formula (1) was then fitted to each plot.

Figure 14A:
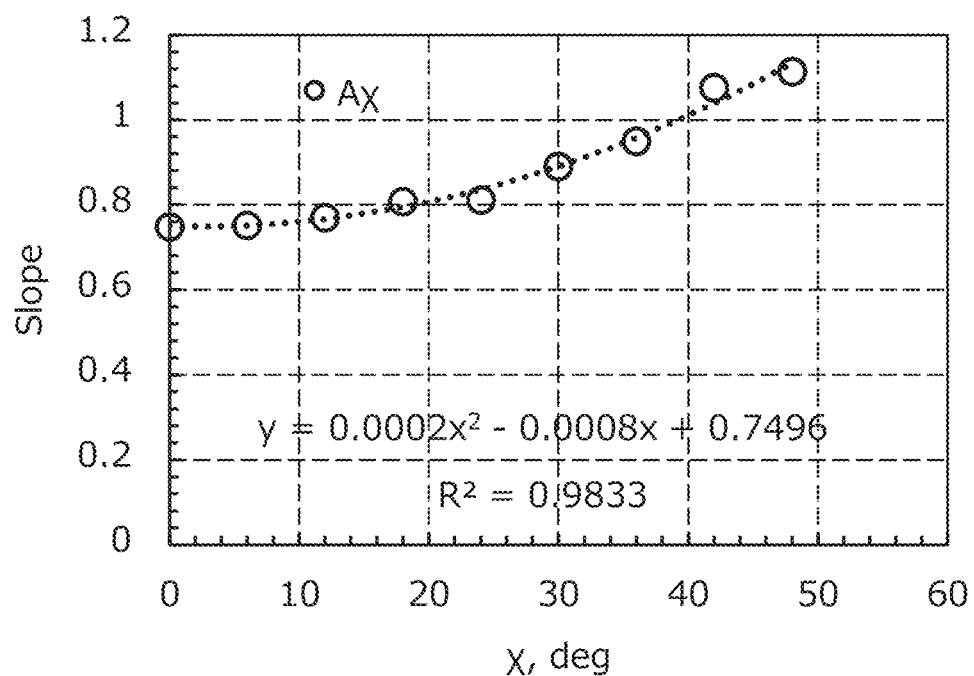
FIGS. 14A and 14B are respectively graphs plotting coefficients $A_\chi$ and $B_\chi$ of the function versus χ.
Figure 14B:
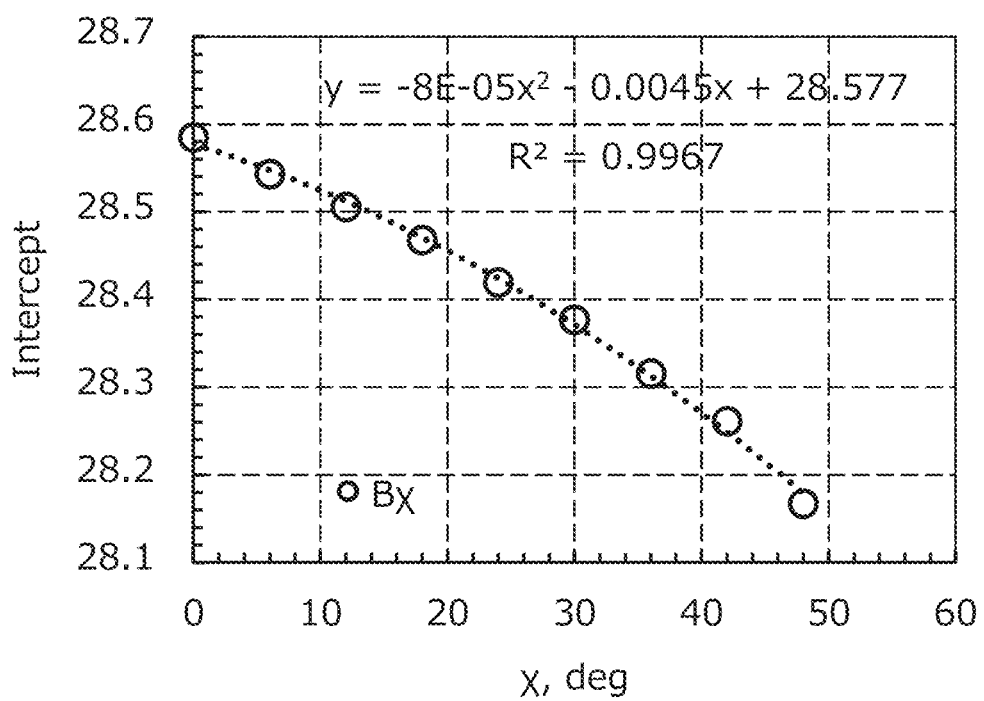

Using the approximate formula determined for each diffraction plane, the coefficients $A_\chi$, $B_\chi$ were plotted with changing the sample rotation angle χ. FIGS. 14A and 14B are respectively graphs plotting coefficients $A_\chi$ and $B_\chi$ of the approximate formula versus χ. Further, the formulas (2) and (3) were fitted to the relationship of the coefficient $A_\chi$ and $B_\chi$ with χ.

Figure 15:
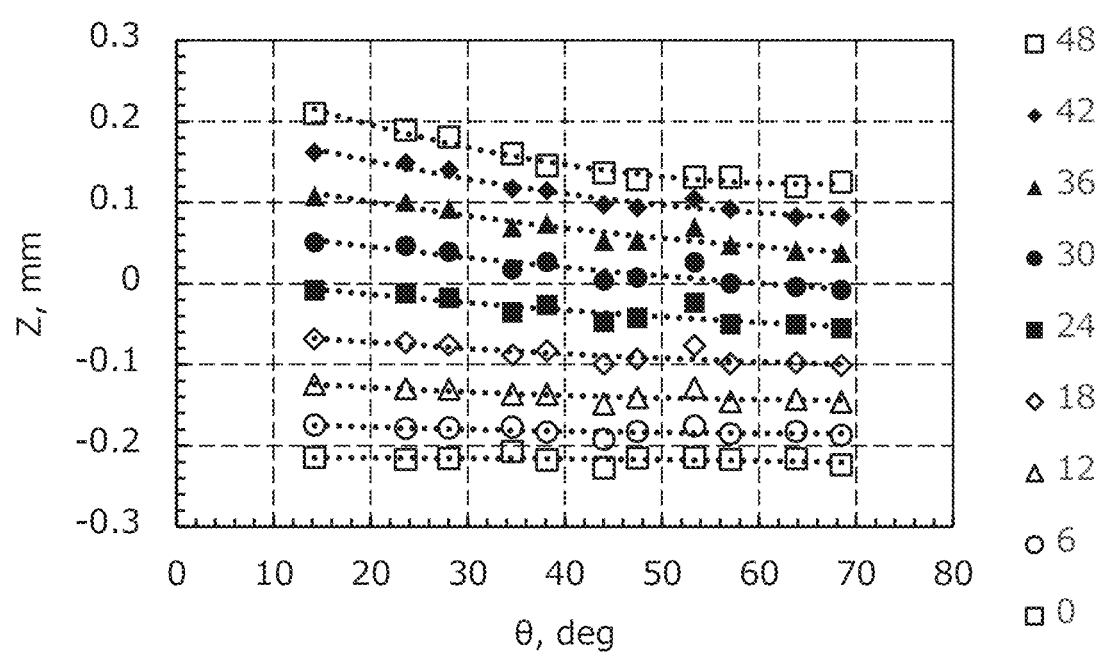
FIG. 15 is a graph plotting Z acquired by the function for each χ and each θ.
Figure 16A:
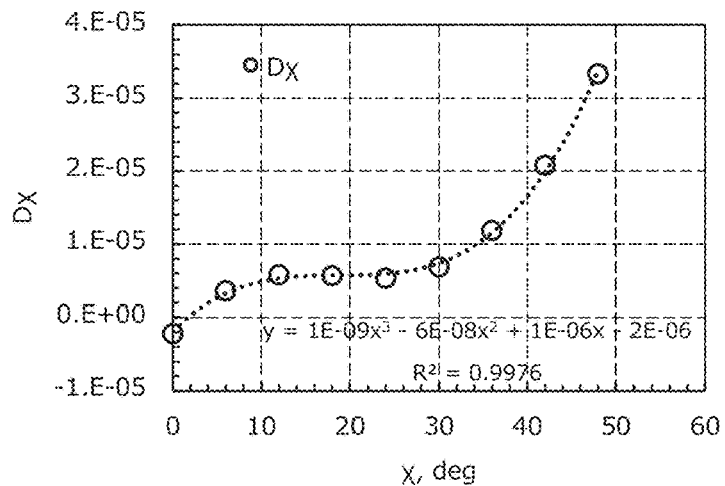
FIGS. 16A to 16C are respectively graphs plotting coefficients $D_\chi$, $E_\chi$ and $F_\chi$ of the function versus χ.
Figure 16B:
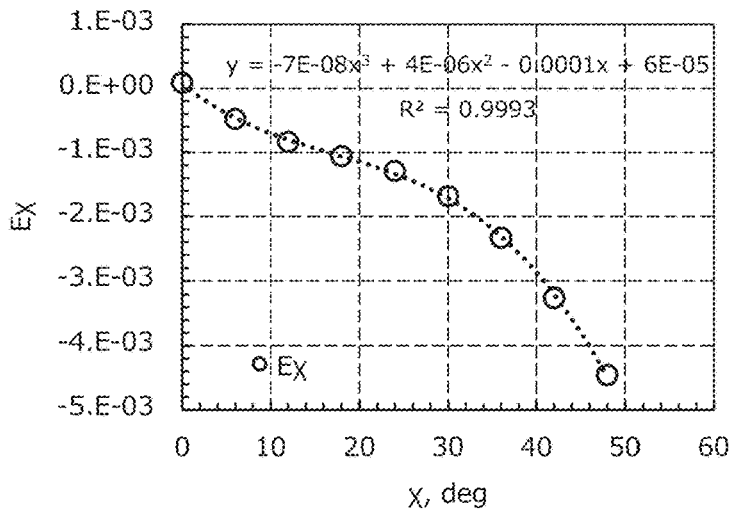
Figure 16C:
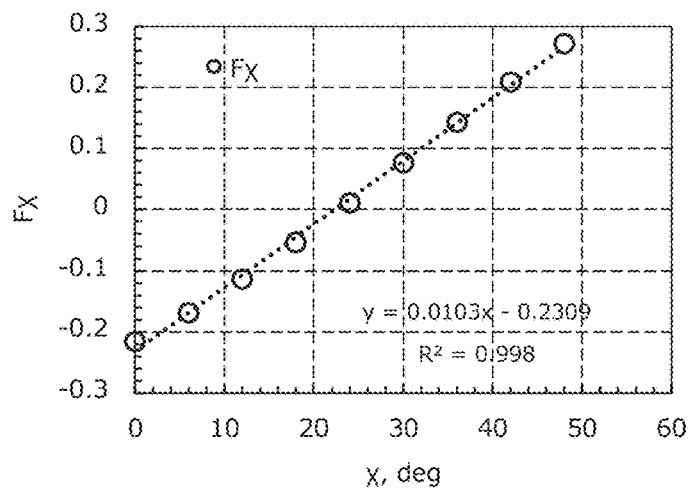

The obtained approximate formula was used to plot Z with respect to each χ and each θ, and the formula (6) was fitted to the plot. FIG. 15 is a graph plotting Z obtained by the approximate formula for each χ and each θ. Further, coefficients $D_\chi$, $E_\chi$, and $F_\chi$ of the obtained approximate formula were plotted for each χ. FIGS. 16A to 16C are respectively graphs plotting coefficients $D_\chi$, $E_\chi$, and $F_\chi$ of the approximate formula versus χ. The formulas (7) to (9) were then fitted to the relationship of the coefficients $D_\chi$, $E_\chi$, and $F_\chi$ with χ. Thus, an approximate formula for calculating Z for each θ and each χ was able to be obtained.

Figure 17A:
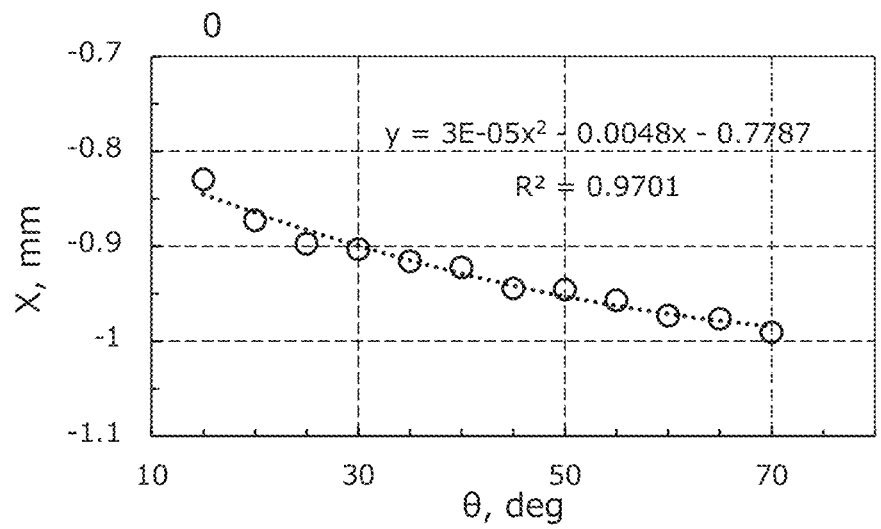
FIGS. 17A and 17B are respectively graphs plotting X acquired with the function for each θ at χ=0° and 30°.
Figure 17B:
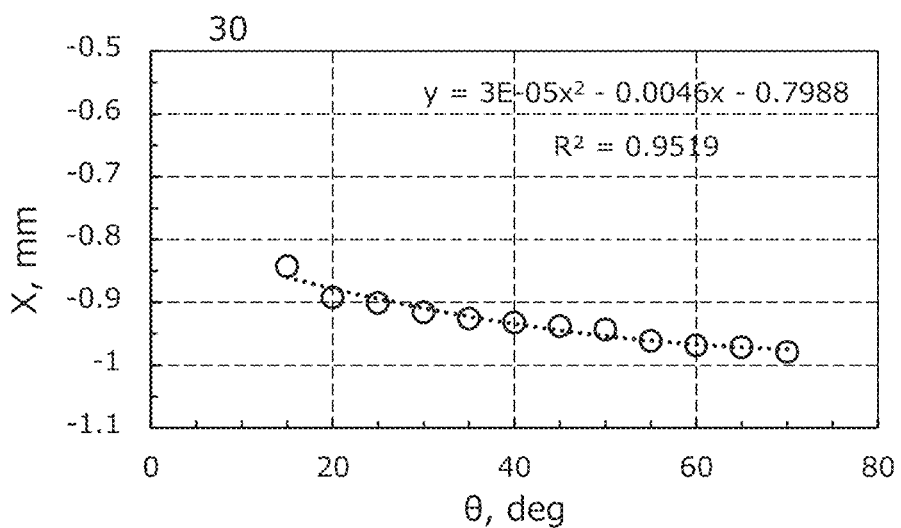
Figure 18A:
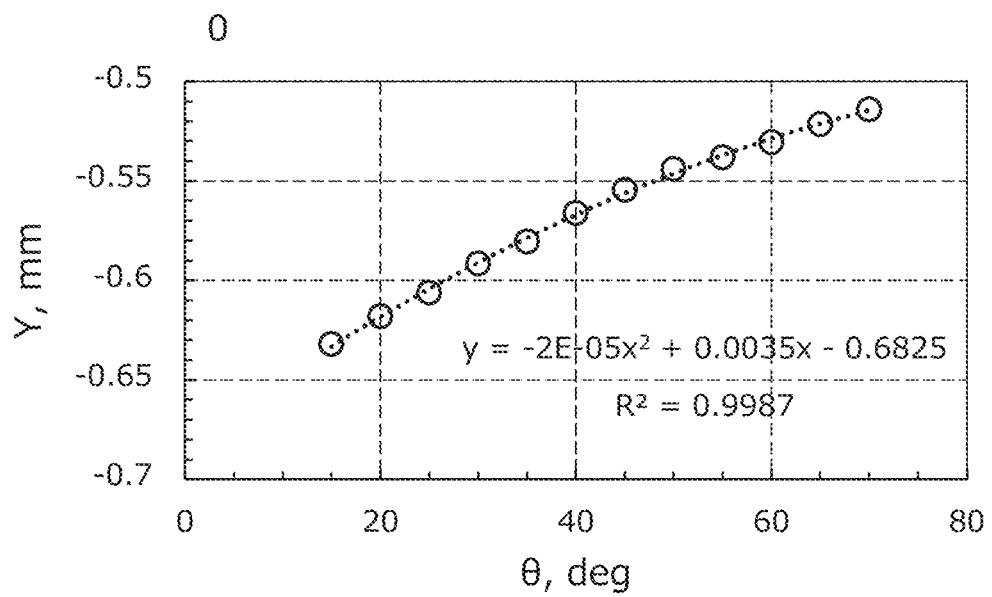
FIGS. 18A and 18B are respectively graphs plotting Y acquired with the function for each θ at χ=0° and 30°.
Figure 18B:
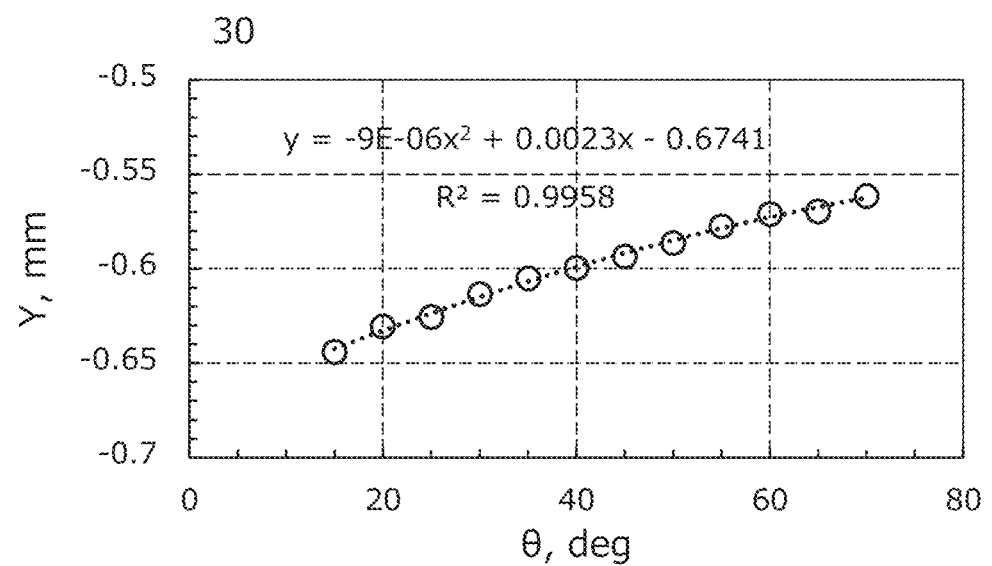

Next, the surface height of the powder sample was adjusted to Z calculated for each θ and each χ, and the beam irradiation positions in the X direction and the Y direction were measured. X and Y were plotted for each χ and each θ, and formulas (11) and (12) were fitted. FIGS. 17A and 17B are respectively graphs plotting X obtained with the approximate formula for each θ at χ=0° and 30°. FIGS. 18A and 18B are respectively graphs plotting Y obtained with the approximate formula for each θ at χ=0° and 30°.

Figure 19A:
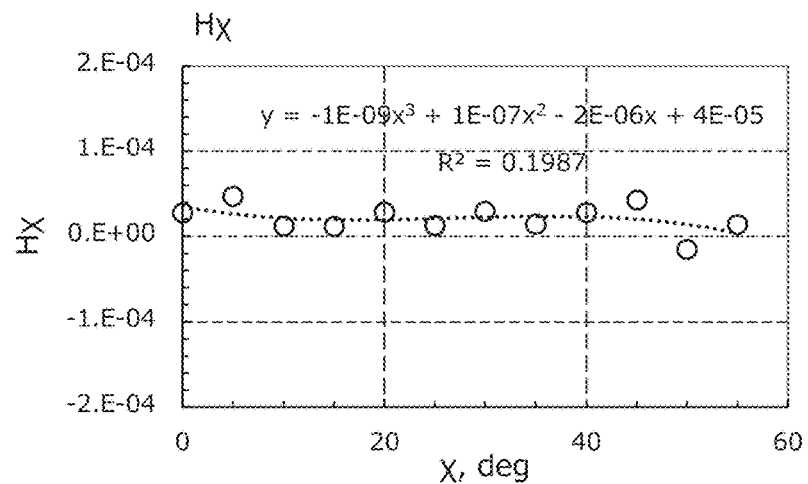
FIGS. 19A to 19C are respectively graphs plotting coefficients $H_\chi$, $I_\chi$ and $J_\chi$ of the function versus χ.
Figure 19B:
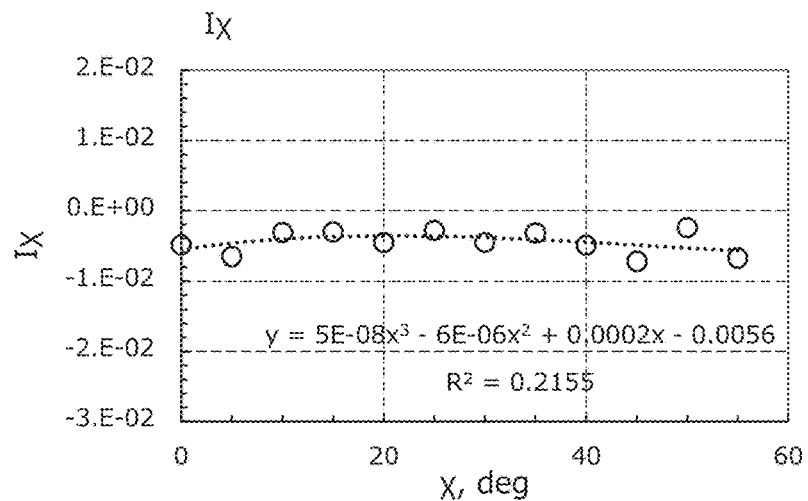
Figure 19C:
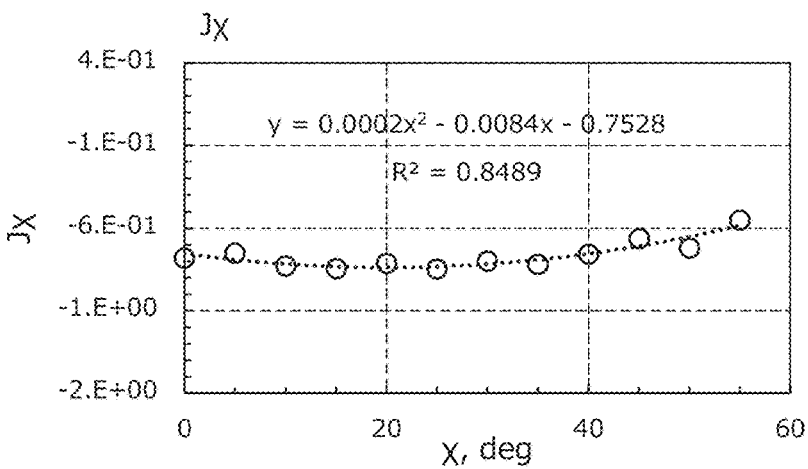
Figure 20A:
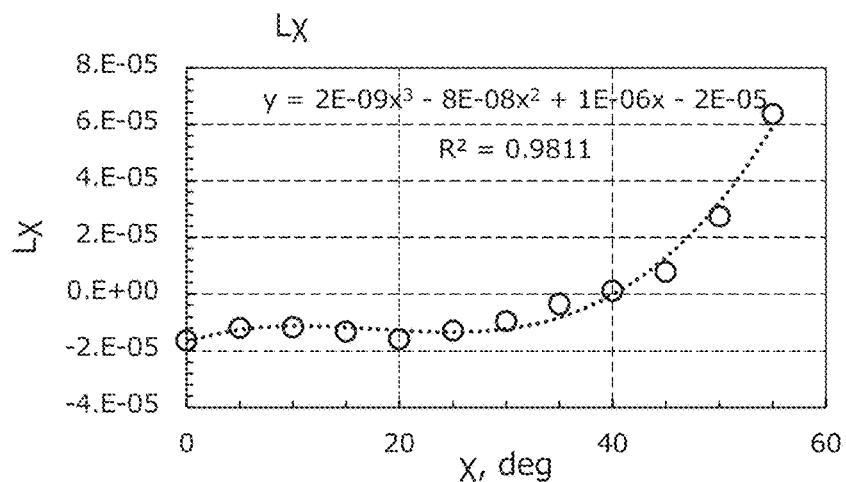
FIGS. 20A to 20C are respectively graphs plotting coefficients $L_\chi$, $M_\chi$ and $N_\chi$ of the function versus χ.
Figure 20B:
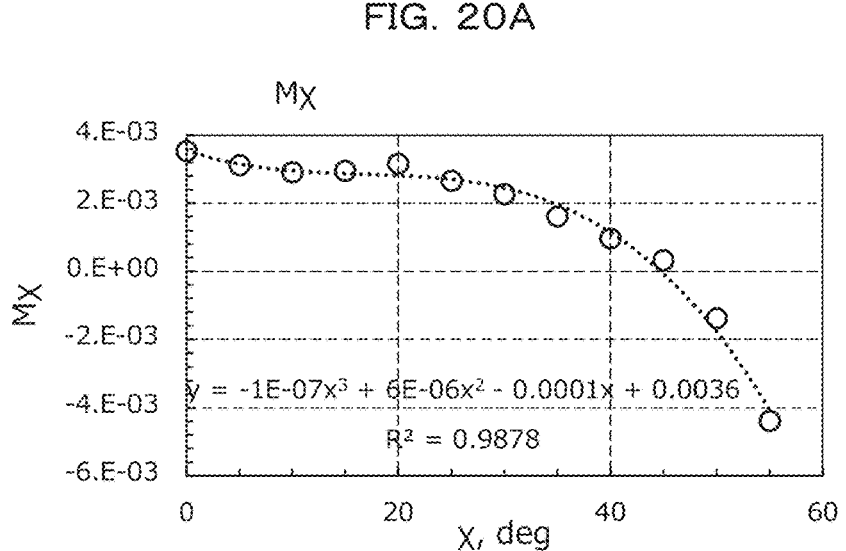
Figure 20C:
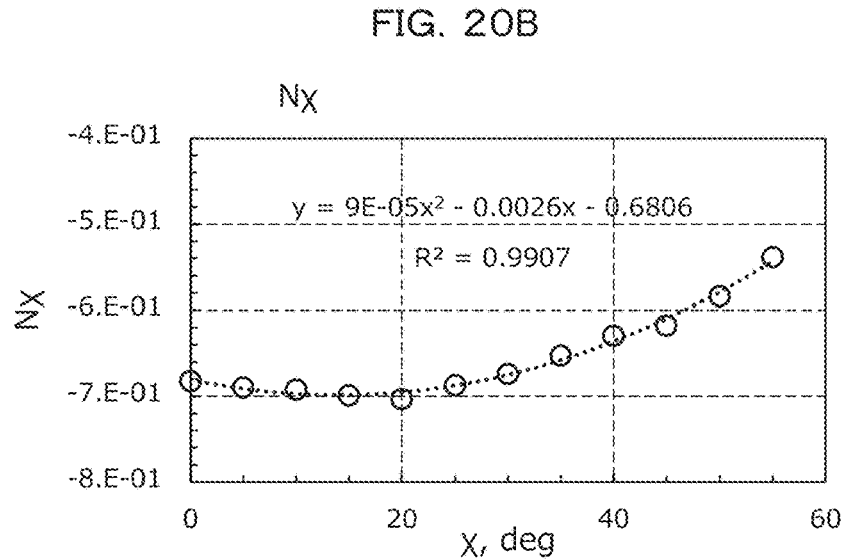
Figure 21:
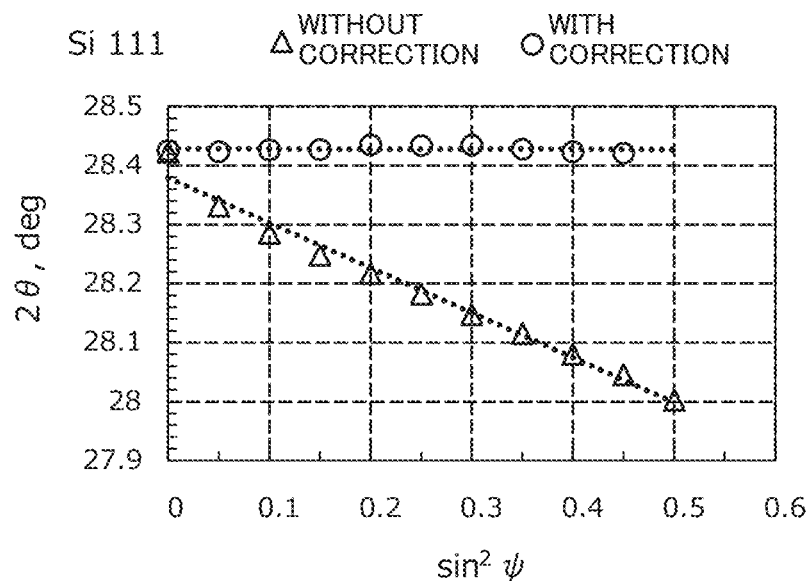
FIG. 21 is a graph showing 2θ for each sin 2 φ with and without corrections for the diffraction plane 111 of the stress free Si powder sample.
Figure 22:
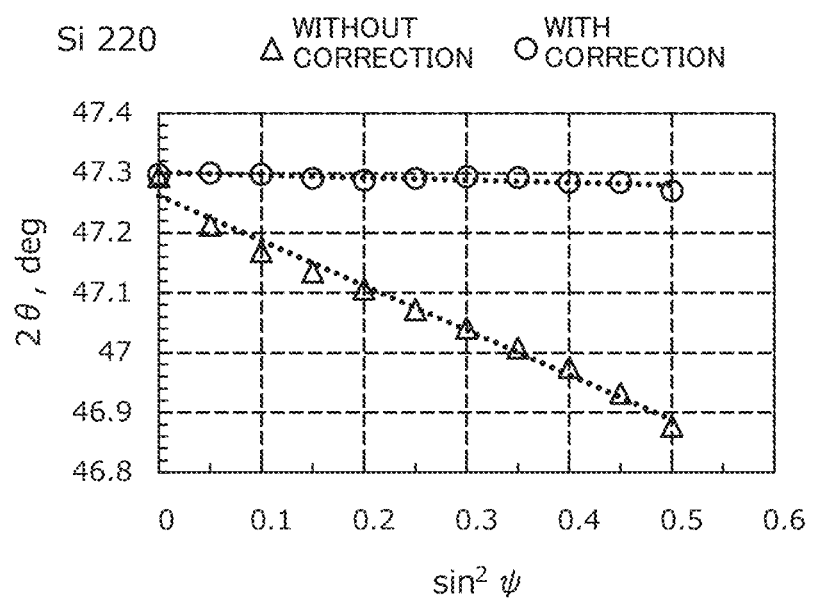
FIG. 22 is a graph showing 2θ for each sin 2 φ with and without corrections for the diffraction plane 220 of the stress free Si powder sample.
Figure 23:
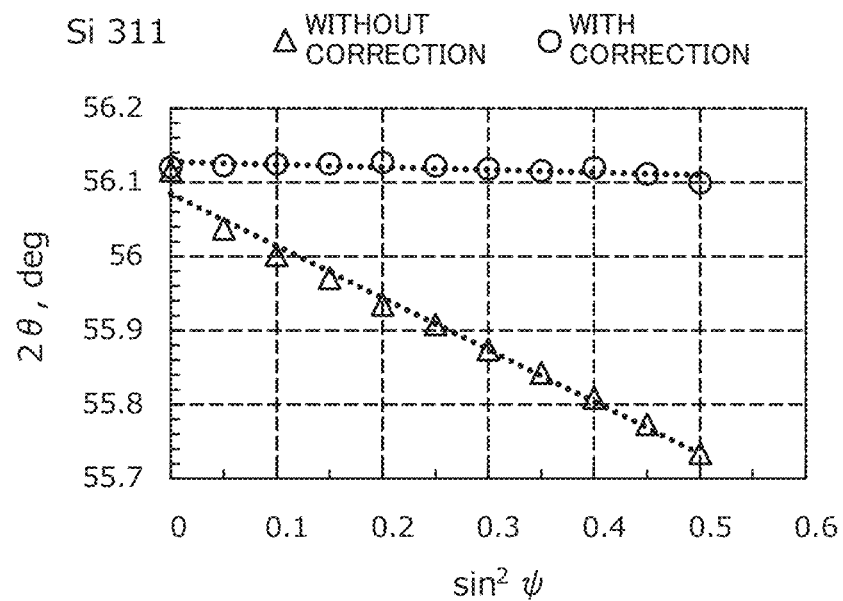
FIG. 23 is a graph showing 2θ for each sin 2 φ with and without corrections for the diffraction plane 311 of the stress free Si powder sample.
Figure 24:
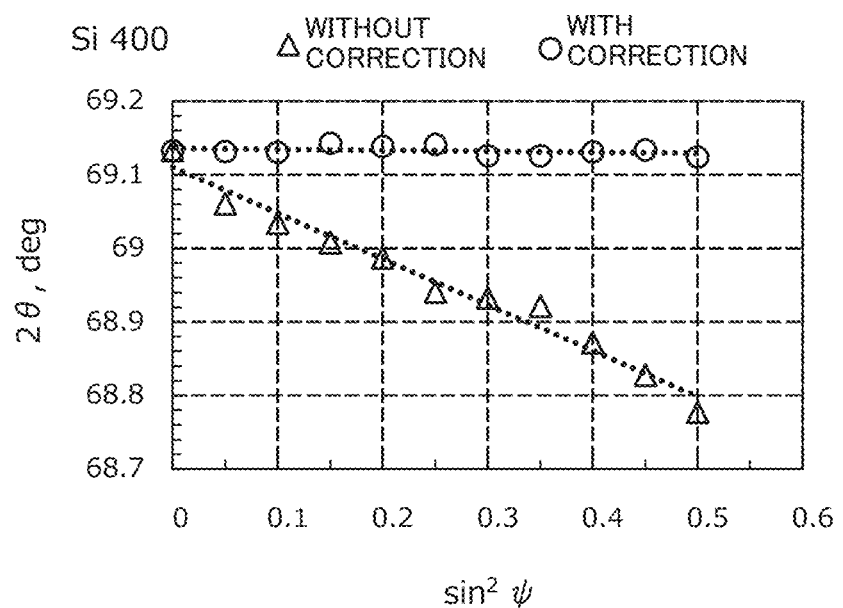
FIG. 24 is a graph showing 2θ for each sin 2 φ with and without corrections for the diffraction plane 400 of the stress free Si powder sample.
Figure 25:
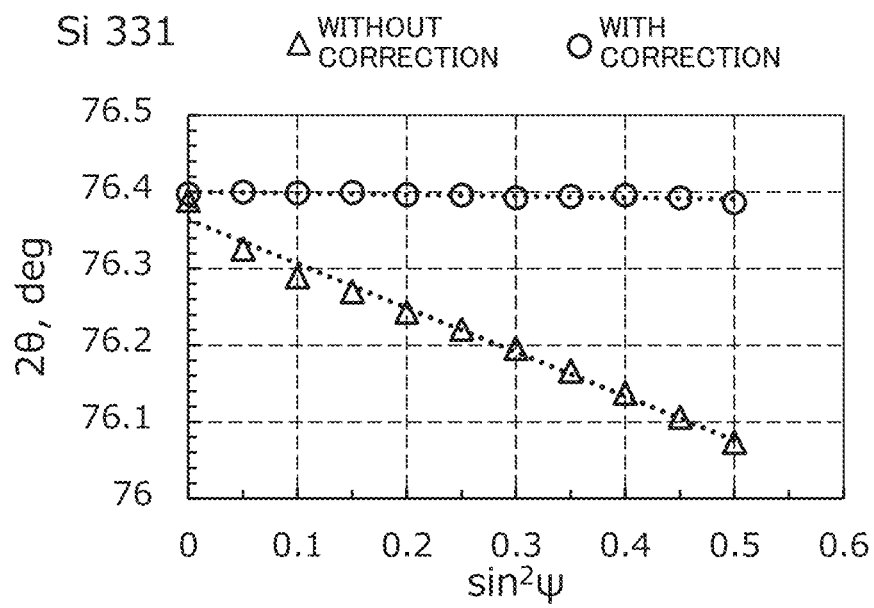
FIG. 25 is a graph showing 2θ for each sin 2 φ with and without corrections for the diffraction plane 331 of the stress free Si powder sample.
Figure 26:
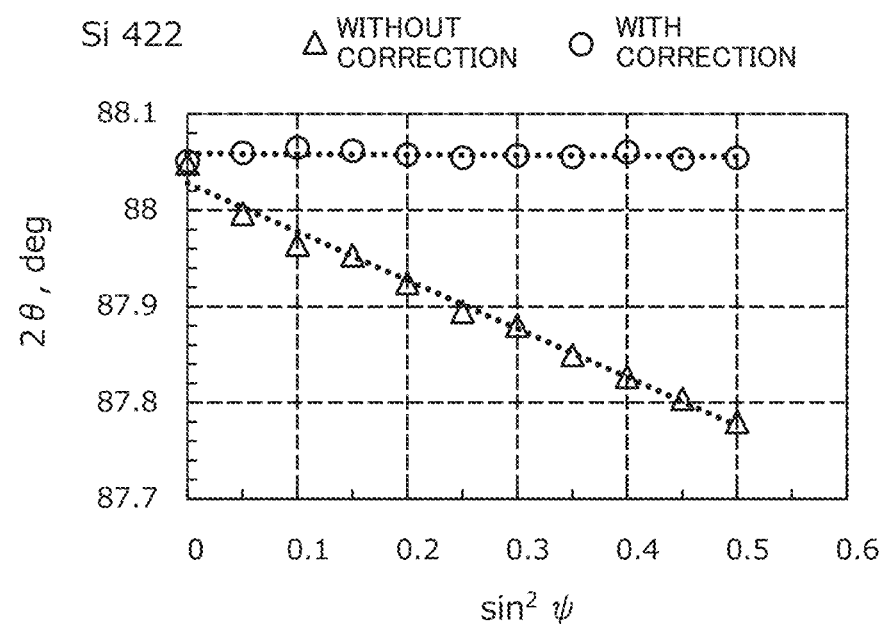
FIG. 26 is a graph showing 2θ for each sin 2 φ with and without corrections for the diffraction plane 422 of the stress free Si powder sample.
Figure 27:
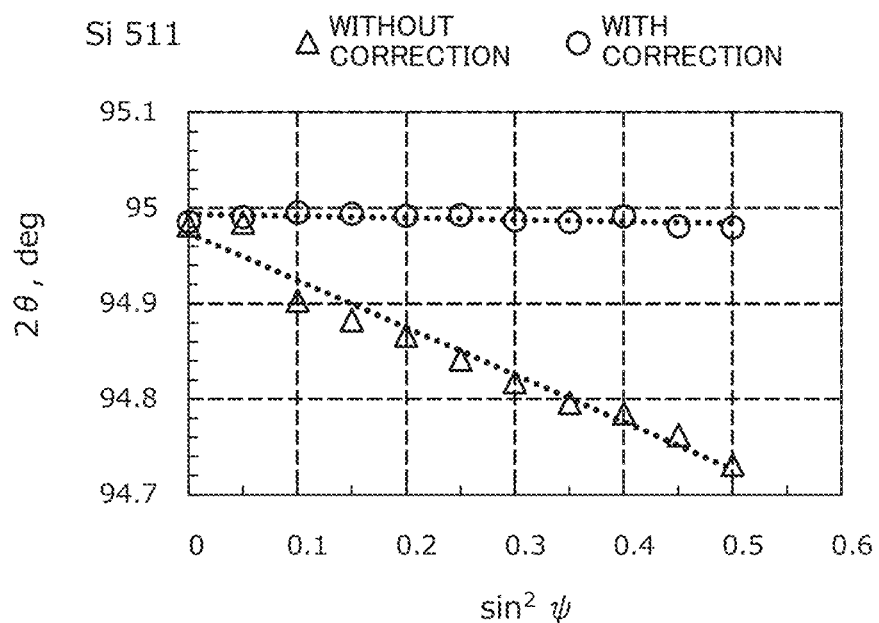
FIG. 27 is a graph showing 2θ for each sin 2 φ with and without corrections for the diffraction plane 511 of the stress free Si powder sample.
Figure 28:
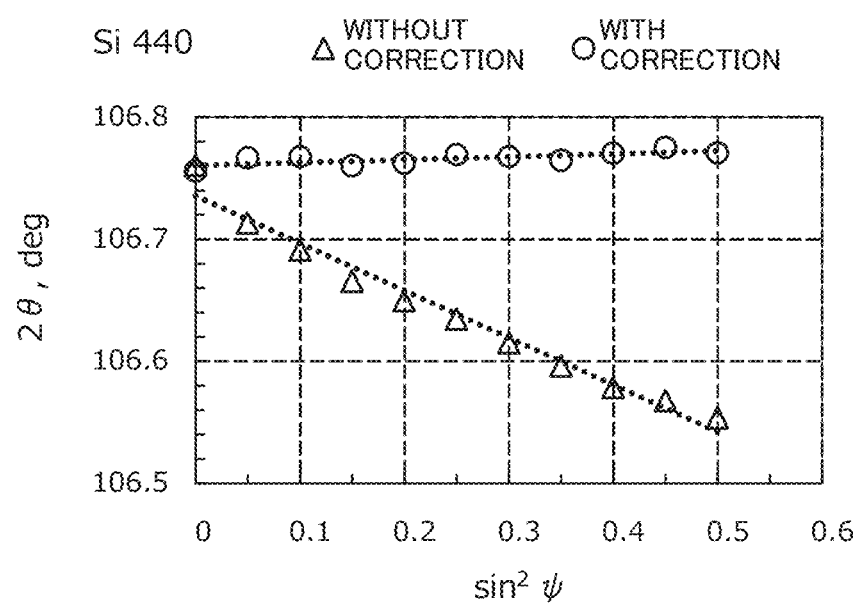
FIG. 28 is a graph showing 2θ for each sin 2 φ with and without corrections for the diffraction plane 440 of the stress free Si powder sample.
Figure 29:
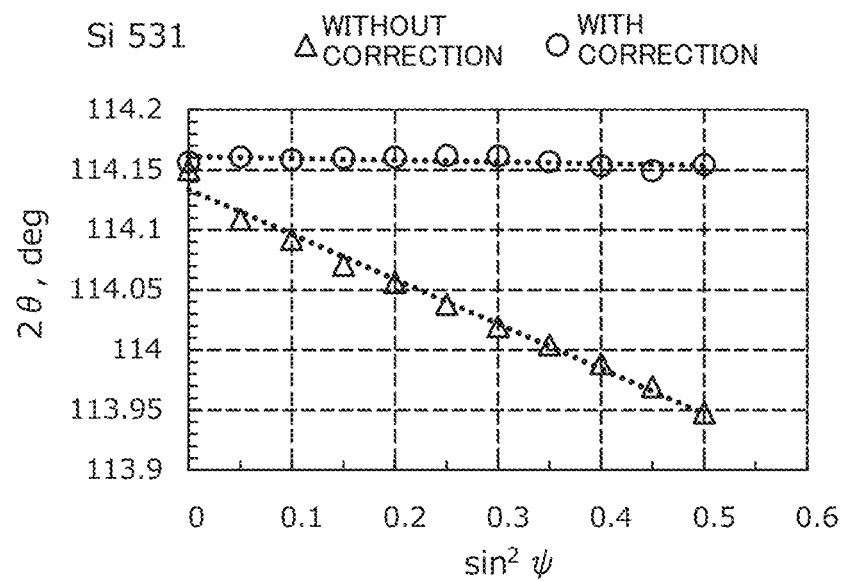
FIG. 29 is a graph showing 2θ for each sin 2 φ with and without corrections for the diffraction plane 531 of the stress free Si powder sample.
Figure 30:
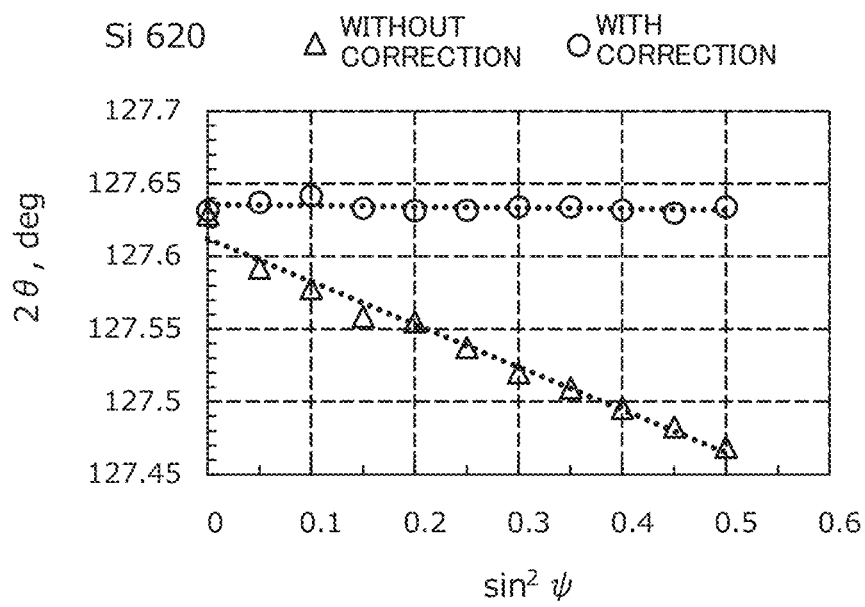
FIG. 30 is a graph showing 2θ for each sin 2 φ with and without corrections for the diffraction plane 620 of the stress free Si powder sample.
Figure 31:
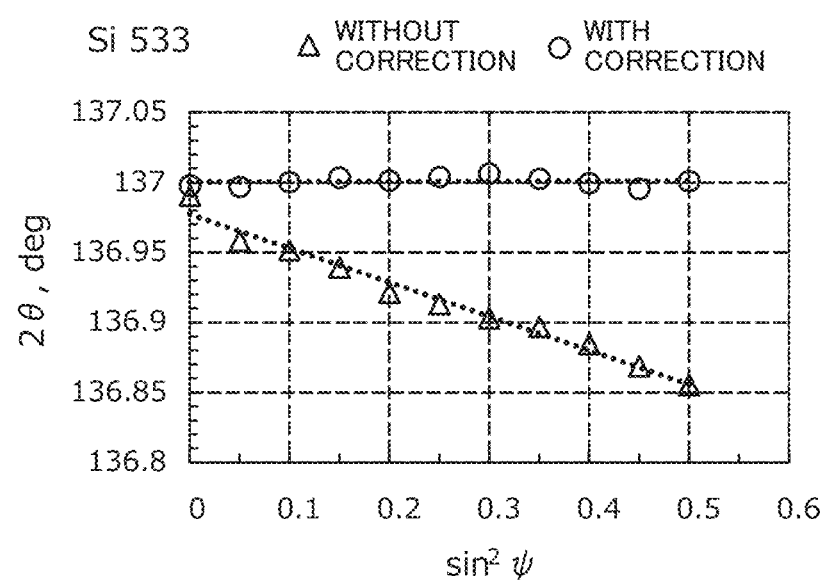
FIG. 31 is a graph showing 2θ for each sin 2 φ with and without corrections for the diffraction plane 533 of the stress free Si powder sample.

Further, the coefficients $H_\chi$, $I_\chi$, $J_\chi$, $L_\chi$, $M_\chi$ and $N_\chi$ of the obtained approximate formulas were plotted for each χ. FIGS. 19A to 19C are respectively graphs plotting coefficients $H_\chi$, $I_\chi$, and $J_\chi$ of the approximate formula versus χ. FIGS. 20A to 20C are respectively graphs plotting coefficients $L_\chi$, $M_\chi$, and $N_\chi$ of the approximate formula versus χ. Through the above processing, the corrected position of X, Y, Z were able to be calculated by approximate formulas for each θ and each χ.

(Verification of Measurement with or without Correction)

Using the calculation results described above, the X-ray diffraction measurement was performed for the strain-free Si powder sample with correcting the deviation while changing χ. X-ray stress measurement was performed using a Si powder sample to evaluate the change in the diffraction angle 2θ when χ was changed for each diffraction plane.

The X-ray stress measurement was performed by sin 2 φ method (side inclination method). FIGS. 21 to 31 are graphs showing 2θ for each sin 2 φ with and without corrections for respective diffraction planes of the stress free Si powder sample. x=φ in 2 θ-sin 2 φ diagram, and the horizontal axis of the graph coincides with χ in the side inclination method.

According to FIGS. 21 to 31, in the case without correction, the diffraction angle 2θ is significantly changed while χ is increased. In the case with correction compared with the case without correction, the change in the diffraction angle 2θ is small, and it indicates a substantially constant value.

Incidentally, this application claims priority under Japanese Patent Application No. 2021-188118, filed on Nov. 18, 2021, and the entire contents of Japanese Patent Application No. 2021-188118 are incorporated by reference in this application.

DESCRIPTION OF SYMBOLS

100 X-ray measurement system
200 X-ray diffraction apparatus
210 X-ray irradiation section
230 sample stage
232 cradle
235 base section
237 head section
238 sample plate
240 goniometer
250 detector
300 computer (correction amount specifying apparatus)
310 diffraction data storing section
320 correspondence relationship determining section
330 correction amount specifying section
350 reference position data storing section
370 correction amount storing section
380 sample position controlling section
400, 500 jig
410, 510 first region
420, 520 second region
R1 incident X-ray
R2 diffracted beam
S0 sample

What is claimed is:

1. A correction amount specifying apparatus for specifying a correction amount for a deviation of an X-ray irradiation position caused by rotation of a sample with respect to a measurement system, comprising:
   processing circuitry configured to
   store diffraction data including a combination of a diffraction angle of the irradiated X-rays with respect to the sample rotation angle and the sample surface height, the diffraction data being acquired by irradiating X-rays to a standard sample that is an aggregate of isotropic and stress free crystal particles,
   determine a first correspondence relationship based on the diffraction data, and
   specify a correction amount of the sample surface height with respect to a desired sample rotation angle and a desired diffraction angle based on the first correspondence relationship.

2. The correction amount specifying apparatus according to claim 1,
   wherein the sample rotation angle is at least one of an angle χ around an axis in a X-rays progressing direction perpendicular to a scattering vector and an angle ω around an axis in a direction perpendicular to an optical path surface.

3. The correction amount specifying apparatus according to claim 1,
   wherein the first correspondence relationship is a polynomial formula of the diffraction angle representing the correction amount of the sample surface height, the polynomial formula having a polynomial formula of the sample rotation angle as a coefficient.

4. The correction amount specifying apparatus according to claim 1, wherein the processing circuitry is further configured to
   control a relative position of the sample with the correction amount of the sample surface height with respect to the desired sample rotation angle and the desired diffraction angle.

5. The correction amount specifying apparatus according to claim 4, wherein the processing circuitry is further configured to
   store a reference position data in a direction parallel to the sample surface measured using a jig whose position is controlled to be corrected in the sample surface height direction with respect to the desired sample rotation angle and the diffraction angle, and
   specify a correction amount in a direction parallel to the sample surface based on the reference position data with a second correspondence relationship.

6. The correction amount specifying apparatus according to claim 5,
   wherein the second correspondence relationship is a polynomial formula of the diffraction angle representing a correction amount in a direction parallel to the sample surface, the polynomial formula having a polynomial formula of the sample rotation angle as a coefficient.

7. The correction amount specifying apparatus according to claim 5, wherein the jig includes
   a flat-plate shape for correcting a deviation of an X-ray irradiation position caused by rotation of a sample with respect to a measurement system; and
   a first region and a second region provided adjacent each other on a receiving surface and respectively formed of materials whose intensity of the scattered X-rays are different,
   wherein the jig is mounted on an X-ray diffraction apparatus so as to be able to measure the scattered X-ray intensity by scanning the irradiation position to cross the boundary between the first region and the second region.

8. The correction amount specifying apparatus according to claim 7,
   wherein the boundaries between the first region and the second region are straight lines perpendicular to each other.

9. The correction amount specifying apparatus according to claim 7,
   wherein the first region is formed of stainless steel and the second region is formed of Si.

10. The correction amount specifying apparatus according to claim 7, wherein the second region is formed of an aggregate of crystal particles.

11. A correction amount specifying method for specifying a correction amount for a deviation of an X-ray irradiation position caused by rotation of a sample with respect to a measurement system, comprising the steps of:
    acquiring diffraction data including a combination of a diffraction angle of the irradiated X-rays with respect to the sample rotation angle and the sample surface height, the diffraction data being acquired by irradiating X-rays to a standard sample that is an aggregate of isotropic and stress free crystal particles,
    determining a first correspondence relationship based on the diffraction data, and specifying a correction amount of the sample surface height with respect to a desired sample rotation angle and a desired diffraction angle based on the first correspondence relationship.

12. A non-transitory computer readable recording medium having recorded thereon a correction amount specifying program for specifying a correction amount for a deviation of an X-ray irradiation position caused by rotation of a sample with respect to a measurement system, causing a computer to execute the processes of:

determining a first correspondence relationship based on a diffraction data including a combination of a diffraction angle of the irradiated X-rays with respect to the sample rotation angle and the sample surface height, the diffraction data being acquired by irradiating X-rays to a standard sample that is an aggregate of isotropic and stress free crystal particles, and specifying a correction amount of the sample surface height with respect to a desired sample rotation angle and a desired diffraction angle based on the first correspondence relationship.

\* \* \* \* \*